United States Patent [19]

Ono

[11] Patent Number: 5,796,496

[45] Date of Patent: *Aug. 18, 1998

[54] IMAGE-DATA PROCESSING APPARATUS WHICH AUTOMATICALLY SELECTS ONE OF A COPYING FUNCTION AND A FACSIMILE FUNCTION BASED ON AN ORIENTATION OF AN ORIGINAL

[75] Inventor: Kenichi Ono, Kanagawa-ken, Japan

[73] Assignee: Kabushiki Kaisha Toshiba, Kawasaki, Japan

[*] Notice: The term of this patent shall not extend beyond the expiration date of Pat. No. 5,534,973.

[21] Appl. No.: 310,388

[22] Filed: Sep. 22, 1994

[30] Foreign Application Priority Data

Sep. 22, 1993 [JP] Japan .................. 5-259249

[51] Int. Cl.⁶ .................. H04N 1/00; H04N 1/04; G03G 15/00
[52] U.S. Cl. .................. 358/498; 358/400; 358/401; 399/85
[58] Field of Search .................. 358/498, 486, 358/462, 464, 447, 449, 452, 401, 400, 468, 444, 496, 296; 355/23, 24, 320; 399/85, 87, 365, 367, 371, 373, 374; H04N 1/00; G03G 15/00, 21/00

[56] References Cited

U.S. PATENT DOCUMENTS

| 4,184,671 | 1/1980 | Sasamori | 355/23 |
| 4,876,609 | 10/1989 | Ogura | 358/443 |
| 5,038,182 | 8/1991 | Tanimoto | 355/320 |
| 5,534,973 | 7/1996 | Harada | 358/498 |

Primary Examiner—Edward L. Coles, Sr.
Assistant Examiner—Kimberly A. Williams
Attorney, Agent, or Firm—Foley & Lardner

[57] ABSTRACT

An image-data processing apparatus includes an image-reading unit which converts an original image on an image-reading area to corresponding image data. The image-data processing apparatus also includes an automatic-document feeder. The automatic-document feeder has a receiving member, which receives originals having the original image, and a mechanism which transports the originals from the receiving member to the image-reading area one by one. The image-data processing apparatus includes an image-forming unit which forms an image on an image bearing member on the basis of the image data in a first mode, an interface device adapted to transmit the image data to an external unit in a second mode, and a control unit for setting the first mode when the automatic-document feeder transports the originals from the back of the originals, and setting the second mode when the automatic-document feeder transports the originals from the front of the originals.

21 Claims, 23 Drawing Sheets

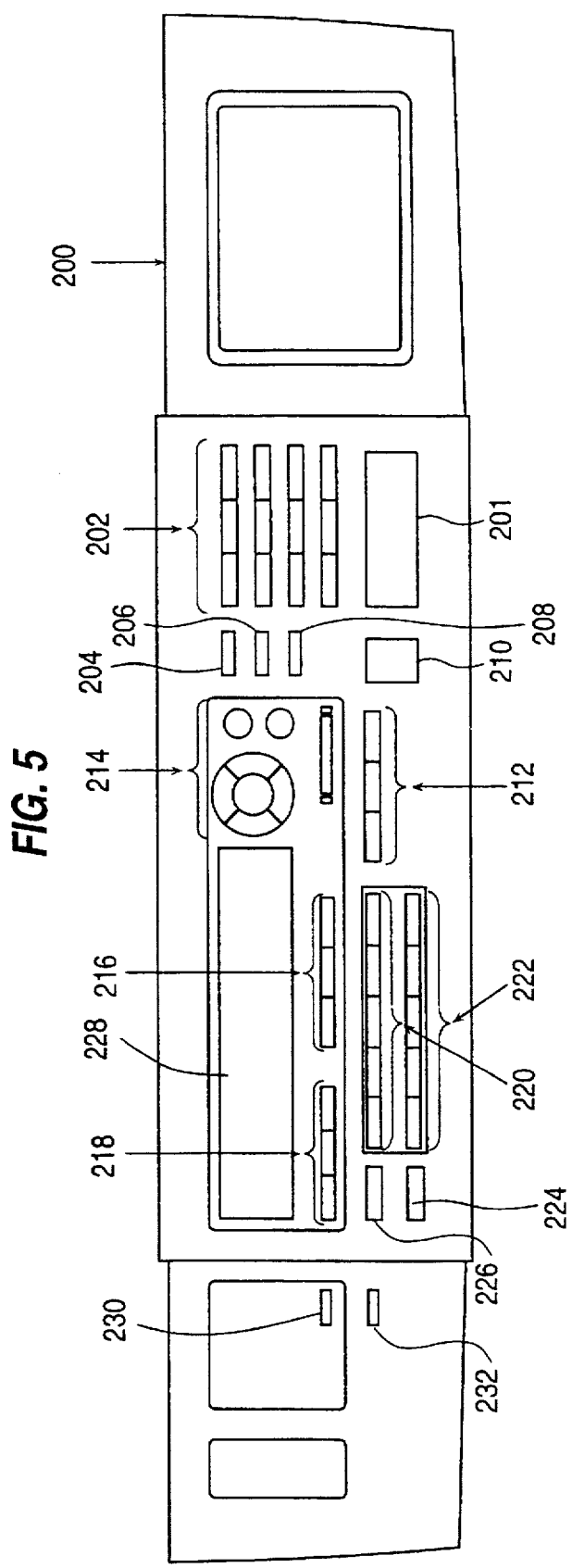

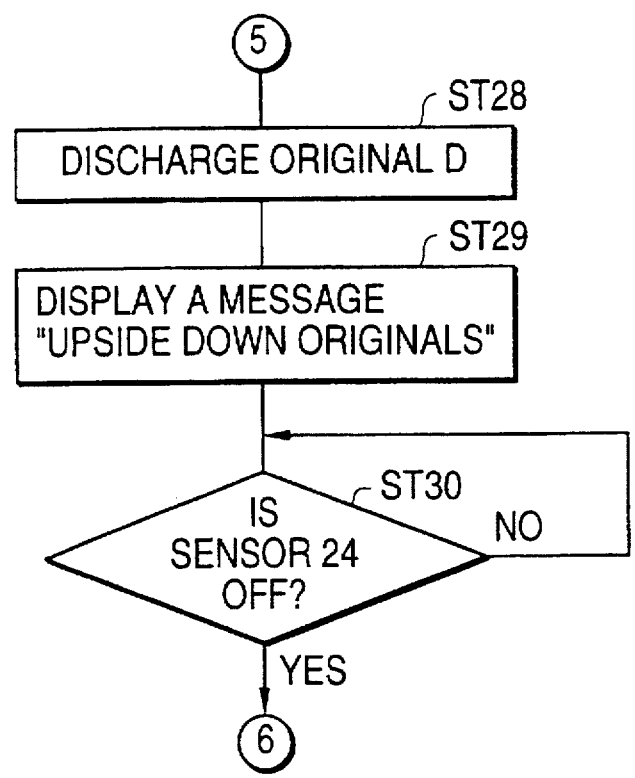

IMAGE-DATA PROCESSING APPARATUS WHICH AUTOMATICALLY SELECTS ONE OF A COPYING FUNCTION AND A FACSIMILE FUNCTION BASED ON AN ORIENTATION OF AN ORIGINAL

BACKGROUND OF THE INVENTION

1. Field of the Invention

The present invention relates to an image-data processing apparatus which has an image-forming function and an image-data transmitting function, and on which an automatic-document feeder is arranged. More specifically, the invention relates to an image-data processing apparatus which automatically selects one of the image-forming function and the image data transmitting function to an external device in accordance with how the originals are transported by the automatic-document feeder.

2. Description of the Related Art

Image-data processing devices which have both an image-forming function, e.g., copying, and an image-data transmitting function, e.g., a facsimile function, include, for example, "Xerox Telecopier 7033 Facsimile Terminal", manufactured by Xerox Corporation.

These devices are helpful, because their dual functionality conserves space that would otherwise be occupied by multiple pieces of office equipment.

Using such devices, however, an operator must select either the image-forming function or the facsimile function by operating a key on a control panel. Furthermore, when an automatic document feeder is used to transport originals of documents to an image reading area one by one, and the image data processing device performs the image-forming (copying) operation, the order of the copied sheets is the reverse of the order of originals. Because the originals are transported face up in order from the first sheet of the originals, the copied sheets are stacked in an order in which the first of the copied sheets, which are face up, is at the bottom of the stack of copied sheets. Thus, an operator must rearrange the copied sheets in the correct order.

SUMMARY OF THE INVENTION

It is therefore an object of the invention to provide an improved image-data processing apparatus.

It is a particular object of the invention to provide an image-data processing apparatus with an automatic-document feeder which automatically selects one of the image-forming function and the image-data transmitting function when the automatic-document feeder is used.

It is a further object of the invention to provide an image-data processing apparatus with an automatic-document feeder in which it is not necessary for an operator to rearrange originals or copied sheets.

Another object of the invention is to provide an improved image-reading apparatus.

It is another object of the invention to provide an improved image data processing method.

It is still another object of the invention to provide an improved image-reading method.

In accordance with one aspect of the invention, the foregoing objects, among others, are achieved by providing an image-data processing apparatus according to the invention, which includes an image-reading unit. The image-reading unit has an electric component which converts an original image on an image-reading area to image data. The apparatus according to the invention also includes an automatic document feeder having a receiving member which receives originals and a mechanism which transports the originals from the receiving member to the image-reading area one by one. The image data processing apparatus according to the invention also includes an image-forming unit. The image-forming unit has an electric component which forms an image on an image bearing member on the basis of the image data in a first mode. The apparatus according to the invention also includes an interface device adapted to transmit the image data to an external unit in a second mode. In an apparatus according to the invention, a control unit sets the first mode when the automatic-document feeder begins transporting the originals from the last sheet of the originals, and sets the second mode when the automatic-document feeder begins transporting the originals from the first sheet of the originals.

In accordance with another aspect, an image-reading apparatus according to the invention includes an image-reading unit which reads an original image on an image-reading area. The image reading apparatus according to the invention also includes an automatic-document feeder having a receiving member, a first mechanism, and a second mechanism. The receiving member receives an original with the original image thereon. The first mechanism transports the original from the receiving member to the image-reading area and the second mechanism turns over the original. The image-reading apparatus also includes a detector for detecting that an original transported to the image-reading area is upside-down. A control unit is provided for controlling the automatic-document feeder so as to turn the original over before the image-reading unit performs the operation of converting the image to image data, when the detector detects that an original transported to the image-reading area is upside down.

In accordance with another aspect of the invention, there has been provided an image-processing method. The method according to the invention includes transporting originals one by one from the receiving member to an image-reading area, converting an original image on an image-reading area to image data, setting a first mode when the originals are transported beginning with the last of the originals, setting a second mode when the originals are transported beginning with the first of the originals, forming an image on an image bearing member on the basis of the image data when in the first mode and transmitting the image data to an external unit when in the second mode.

In accordance with still another aspect of the present invention, there has been provided an image-reading method, including the steps of: transporting an original from the receiving member to the image-reading area; detecting that the original transported to the image-reading area is upside down; turning over the original when the original transported to the image-reading area is upside down; and reading an original image on an image-reading area.

BRIEF DESCRIPTION OF THE DRAWINGS

A more complete appreciation of the present invention and many of the attendant advantages thereof will be readily obtained as the invention becomes better understood by reference to the following detailed description, when considered in connection with the accompanying drawings, wherein:

FIG. 5 is a plan view of a control panel;

FIGS. 7(a), 7(b) and 7(c) represent a flow chart showing an operation of the control section;

DETAILED DESCRIPTION OF THE PREFERRED EMBODIMENTS

Figure 1:
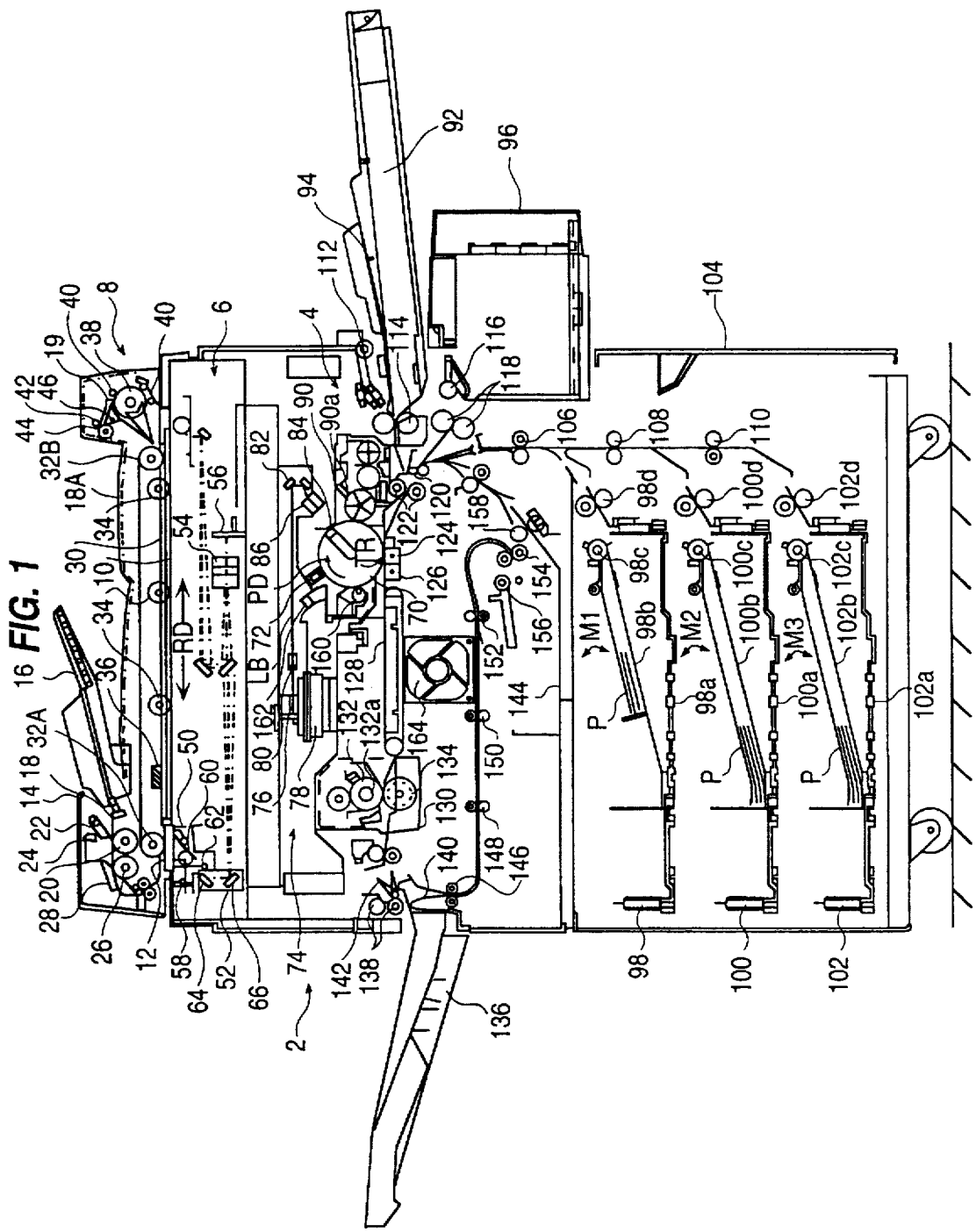
FIG. 1 is a sectional view showing the arrangement of a copying machine.

FIG. 1 shows a copying machine 2 as an image-data-processing apparatus according to an embodiment of the present invention. Copying machine 2 has three functions. These are a copying function, a facsimile function, and a printing function.

Copying machine 2 includes an image-forming portion 4 at the central portion thereof. An image-scanning portion 6 is arranged at the upper portion of image-forming portion 4. Furthermore, an automatic-document feeder 8 is arranged at the top of copying machine 2.

A platen 10, which is a transparent material such as glass, is fixed on the upper surface of image-scanning portion 6. Automatic document feeder 8 is removable and can be positioned to cover or not cover platen 10. A scale 12, useful for indicating placement position and for positioning an original D, is fixed at one end of platen 10 along the longitudinal direction thereof.

Figure 2:
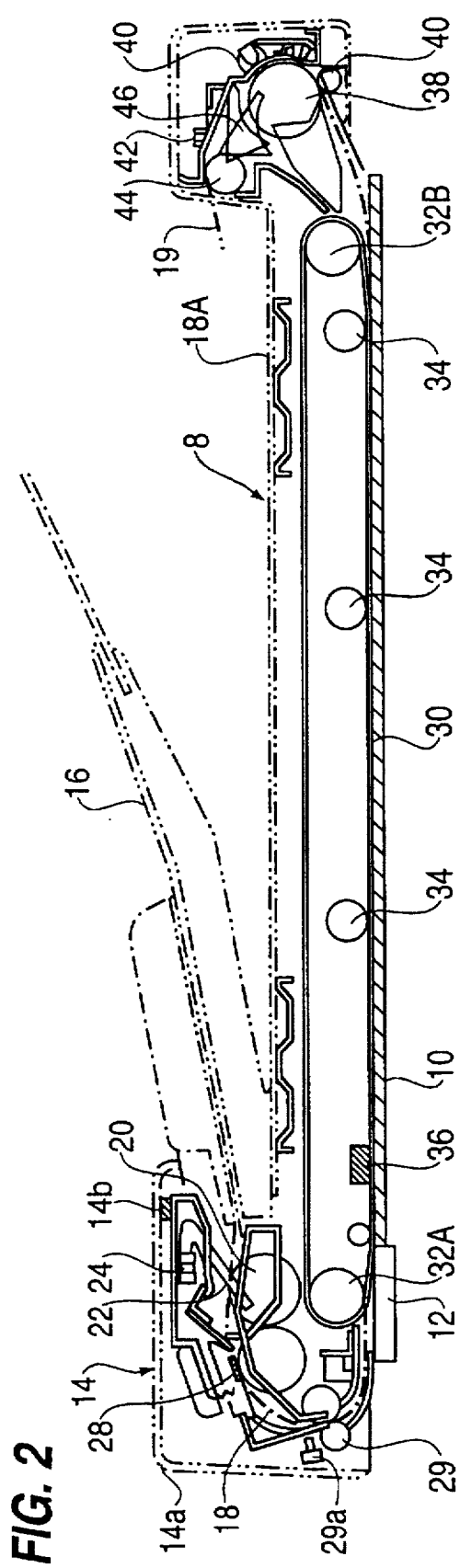
FIG. 2 is an enlarged view of a portion of the sectional view of FIG. 1.

Automatic-document feeder 8, as shown in FIG. 2, includes a housing 14 and a receiving member, such as a tray 16, and feeds document D from tray 16 through a document-transport pass 18 onto platen 10. After original D has been scanned by image-scanning portion 6, automatic-document feeder 8 discharges the sheets of original D to a discharge portion 18A on housing 14 through a document-discharging pass 19, so that the original surface is up. A pick-up roller 20, a weight 22 for pressing document D to pick-up roller 20, a document-detecting sensor 24, a document-transport roller 26, a friction plate 28, and an aligning roller pair 29 are arranged along document-transport pass 18 in the document-transport direction. Housing 14 includes a housing cover 14a, which is arranged to removably cover these document transporting mechanisms. When housing cover 14a is open, an operator is allowed to remove a jammed original in housing 14. A sensor 14b is arranged near housing cover 14a to detect when housing cover 14a is open. When sensor 14b detects this open condition, automatic-document feeder 8 does not work to transport original D.

An aligning switch 29a is arranged just upstream of aligning roller pair 29 along document-transport pass 18 to detect original D.

Pick-up roller 20 picks up original D placed on tray 16. At that time, weight 22 presses original D toward pick-up roller 20 in order to facilitate the picking-up operation. Pickup roller 20 and weight 22 form a pick up mechanism. Document-transport roller 26 feeds the sheets of original D, one by one, downstream. Friction plate 28 prevents document-transport roller 26 from transporting a plurality of originals at the same time. The leading edge of original D is aligned by aligning roller pair 29 with aligning switch 29a, then original D is transported onto platen 10. These mechanisms work only when document-detecting sensor 24 detects that original D is on tray 16.

A document-conveying belt 30 is stretched by belt rollers 32A and 32B to cover platen 10 on the bottom of automatic-document feeder 8. Document-conveying belt 30 is typically a white, wide, endless belt and is driven in the forward and reverse directions by a belt driving mechanism (not shown). A plurality of belt-retaining rollers 34 and a set switch 36 are arranged at the back side of the inner circumference of document-conveying belt 30. Belt-retaining rollers 34 press document-conveying belt 30 against platen 10 to transport each sheet of original D between document-conveying belt 30 and platen 10. Set switch 36 detects the trailing edge of an original sheet to position that sheet of original D to a suitable position. Original D transported by aligning roller pair 29 is positioned at an image-reading area on platen 10 by document-conveying belt 30.

A document-transport roller 38, pinching rollers 40, a document-detecting sensor 42, and a discharging roller 44 are arranged along document-discharging pass 19 in the document-transport direction. Document transport roller 38 transports the sheet of original D which is transported by document-conveying belt 30 while pinching roller 40 presses that sheet of original D against document-transporting roller 38. Document-detecting sensor 42 detects the trailing edge of the sheet of original D to detect its discharge. Discharging roller 44 discharges the sheet of original D onto discharge portion 18a.

Furthermore, a gate 46 is arranged between document-transporting roller 38 and discharging roller 44. Gate 46 guides the sheet of original D to platen 10 so that an opposite surface of original D faces platen 10. In this case, document-conveying belt 30 is driven in the reverse direction. Gate 46 in connection with belt 30 and transporting roller 38, form a turn-over mechanism.

Figure 3A:
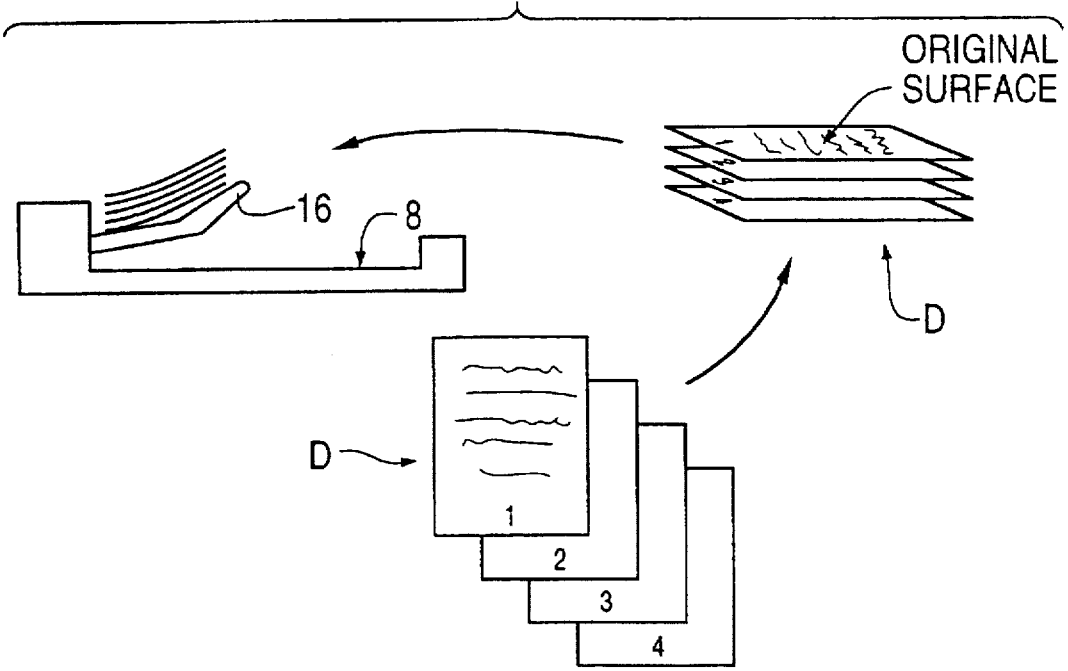
FIGS. 3(a) and 3(b) are front views illustrating placements of originals onto a tray.
Figure 3B:
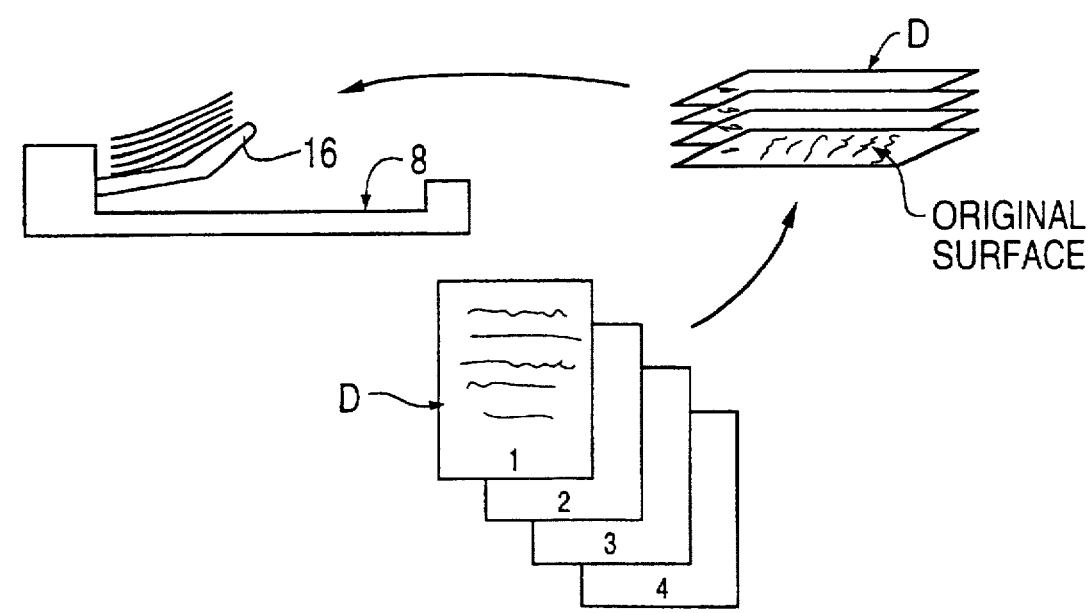

As shown in FIG. 3(a), when a plurality of originals D is copied, it is useful to put the originals on tray 16 so that the original faces are up. In this case, originals D are copied one by one from the bottom sheet, which is the last sheet of the originals. Copied paper sheets whose copied images are face up, are stacked one by one from the bottom sheet as described later herein. Thus, the orders of both the sheets of original D and the copied paper sheets will be the same. On the other hand, as shown in FIG. 3(b), when a plurality of originals D is transmitted by a facsimile function, it is helpful to place the original sheets on tray 16 so that the originals are face down with the first sheet on the bottom. In this case, sheets of originals D are transmitted one by one from the bottom, which is the first sheet of the original and is typically a cover letter. Thus, a recipient can see the cover letter before the transmission is completed, and know to whom the following sheets are being transmitted or what the content being transmitted is.

Figure 4:
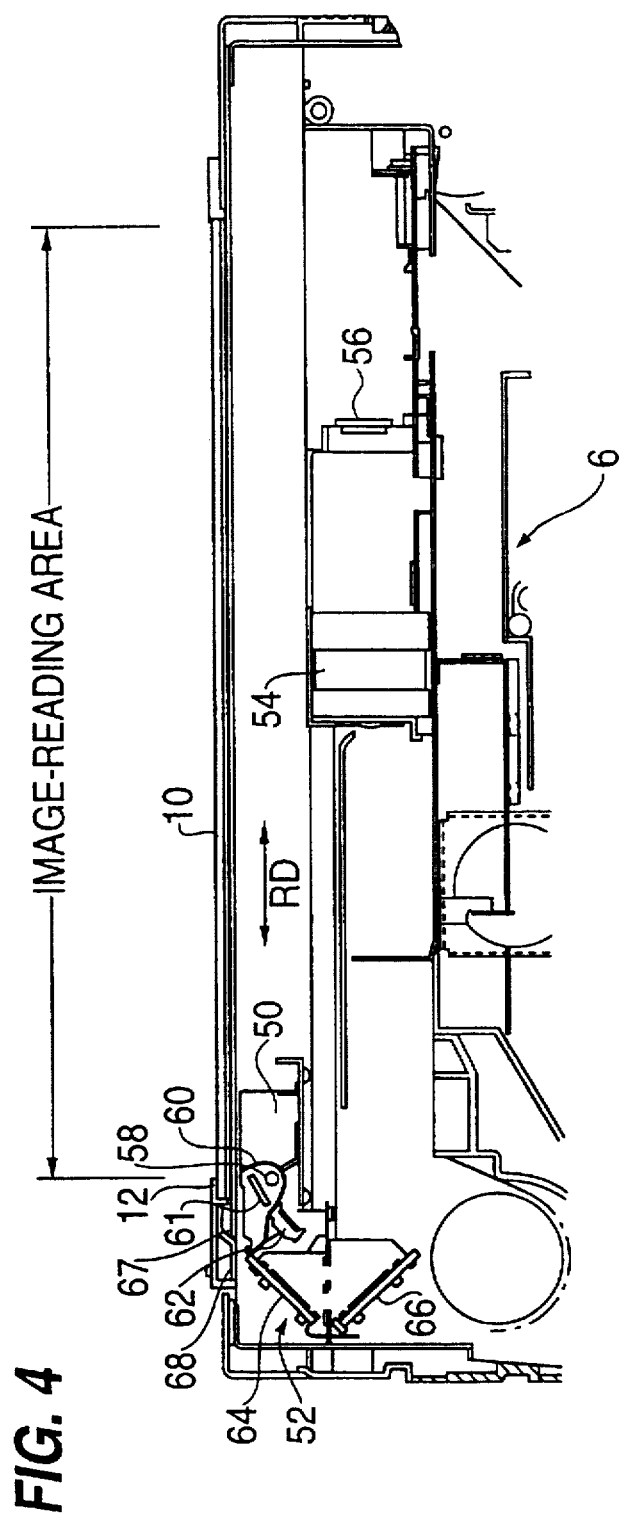
FIG. 4 is an enlarged view of a portion of the sectional view of FIG. 1.

Original D placed on platen 10 is scanned for image exposure by image-scanning portion 6. As shown in FIG. 4, image-scanning portion 6 includes an image scanning means having, for example, a first carriage 50, a second carriage 52 and a lens block 54 for focusing the light from original D onto a CCD sensor 56. First carriage 50 includes an exposure lamp 58, a reflector 60 for reflecting the light from exposure lamp 58 to platen 10, a thermal lamp and a mirror 62. Second carriage 52 includes a mirror 64 and a mirror 66. A shading correction reference plate 67 and an original-size indicator 68 are arranged on one end portion of platen 10 near scale 12. Shading correction reference plate 67 is used for the shading correction of CCD sensor 56.

Original size indicator 68 indicates an effective area over which an original image is actually read on platen 10. The effective area changes depending on the paper sheet size copied, and/or magnification ratio. First carriage 50 and second carriage 52 are moved by a pulse motor (not shown), through a driving belt and some gears (not shown). Therefore, when image-scanning portion 6 scans original D, original D is exposed by exposure lamp 58 while first carriage 50 and second carriage 52 reciprocate in the direction indicated by an arrow RD along the under surface of platen 10. In this case, second carriage 52 moves at a speed half that of first carriage 50 in order to maintain a fixed optical path length.

A reflected light beam from original D scanned by image-scanning portion 6 is reflected by mirror 62, mirror 64 and mirror 66, transmitted through lens block 64 and then directed to a detecting means, for example, CCD sensor 56. CCD sensor 56 outputs electric signals corresponding to the reflected light beam indicating the original image of original D. In this embodiment, one pixel of original D corresponds to one element of CCD sensor 56.

Image-forming portion 4 forms an image corresponding to signals output by CCD sensor 56 or provided by an external device. Referring again to FIG. 1, image-forming portion 4 includes a photosensitive drum 70. Photosensitive drum 70 is rotated by a motor (not shown) in the direction indicated by an arrow PD so that its surface is wholly charged first by a main charger 72 so that a potential of the circumferential surface is about −750V. A laser beam LB is projected on the charged surface of photosensitive drum 70 by a laser unit 74, forming an electrostatic latent image. Laser unit 74 includes a semiconductor laser oscillator (not shown) for generating laser beam LB modulated in accordance with dot image data on the basis of the signal output from CCD sensor 56 or the external device. Laser unit 74 also includes a collimator lens (not shown) for focusing laser beam LB emitted from the laser oscillator, so that a cross-sectional shape of the laser beam LB is circular, a polygon mirror 76 for scanning laser beam LB focused by the collimator lens, and a mirror motor 78 for rotating polygon mirror 76 at a high speed. Furthermore, laser unit 74 includes a first f 0 lens 80 to unify the focusing of the laser beam LB from polygon mirror 76 in the scanning direction, a mirror 82 and a mirror 84 for reflecting laser beam LB, and a second f 0 lens 86 to unify the focusing of the laser beam LB.

The electrostatic latent image is developed into a visible image, which is a toner image, by a developing roller 90a of a developing unit 90 using two component developing agents. A bias voltage provided to the developing unit 90 is about −500V. Each paper sheet P as an image record media is delivered one by one from one of a paper cassette 92, a paper tray 94 located on paper cassette 92, a large-capacity feeder 96, a paper cassette 98, a paper cassette 100, and a paper cassette 102. Paper cassette 98, paper cassette 100, and paper cassette 102 are removably arranged in a pedestal 104 of copying machine 2. Paper cassette 98, paper cassette 100, and paper cassette 102 have a cassette case 98a and a movable plate 98b, a cassette case 100a and a movable plate 100b, and a cassette case 102a and a movable plate 102b, respectively. Paper sheet P is placed on movable plate 98b, movable plate 100b, and movable plate 102b. Each of movable plates 98b, 100b, and 102b is moved in the direction indicated by an arrow M1, an arrow M2, and an arrow M3, respectively. Before paper sheet P is picked up, movable plates 98b, 100b, and 102b are moved upward. Paper sheets P in paper cassettes 98, 100, and 102 are picked up by pick-up rollers 98c, 10c, and 102c, respectively, and transported to transport roller pairs 98d, 100d, and 102d, respectively. After that, a paper sheet P is transported by transport roller pairs 106, 108, and/or 110.

On the other hand, paper sheet P in paper cassette 92 and paper tray 94 is picked up by a pick-up roller 112, and transported by a transport roller pair 114. Paper sheet P in large-capacity feeder 96 is picked up by a pick-up roller 116, and transported by a transport roller pair 118. Each of transport roller pairs 98d, 100d, 102d, 114, and 118 is a conventional paper separating mechanism for transporting paper sheets P one by one and is constructed by a transport roller and a separation roller.

A paper sheet P delivered from paper cassette 92, paper tray 94, large-capacity feeder 96, paper cassette 98, paper cassette 100, or paper cassette 102 is detected by an aligning switch 120 just upstream of aligning roller pair 122 in the transportation direction of paper sheet P. Then, each paper sheet P is delivered to a transfer region TR by aligning roller pair 122 timed in accordance with the formation of the visible image on drum 170.

Paper cassette 92, paper tray 94, large-capacity feeder 96, paper cassette 98, 100, and 102 can be alternatively selected by the operator using a control panel described later herein.

Paper sheet P delivered to transfer region TR comes into contact with the surface of photosensitive drum 70, in the space between a transfer charger 124, which is a DC corona discharger, and photosensitive drum 70. As a result, the toner image on photosensitive drum 70 is transferred to paper sheet P by the agency of transfer charger 124. After the transfer, paper sheet P is separated from photosensitive drum 70 by a separation charger 126, which is a vibratory (AC+DC) corona discharger, and transported by a conveyor belt 128. Separation charger 126 removes the electrostatic force supplied between photosensitive drum 70 and paper sheet P in order to separate the paper sheet from photosensitive drum 70. Thereafter, paper sheet P is delivered to a fixing unit 130 arranged at the terminal end portion of conveyor belt 128 along a paper path.

Fixing unit 130 includes a heat roller 132 which has a heater lamp 132a and a pressure roller 134, which is arranged in contact with heat roller 132. As paper sheet P passes a nip portion between heat roller 132 and pressure roller 134, the transferred image is fixed on paper sheet P. After the fixation, paper sheet P is discharged into a tray 136 outside a housing by exit roller pair 138.

If paper sheet P, however, is to have a two-sided copying or a multiple copying, paper sheet P, instead of being discharged directly to tray 136 through exit roller pair 138, is sent into a retransporting path 140 by means of a gate unit 142. Gate unit 142 is arranged between fixing unit 130 and exit roller pair 138. Gate unit 142 guides paper sheet P to a paper tray 144. Paper-transport roller pairs 146, 148, 150, 152, and 154 transport paper sheet P to paper tray 144. After paper sheet P is transported to paper tray 144, paper sheet P is picked up by a pick-up roller 156, and transported to aligning roller pair 122 by a paper-transport roller pair 158. In this way, paper sheet P is transported to the transfer region again and the two-sided copying is performed.

After the transfer the residual toner on the surface of photosensitive drum 70 is removed by a cleaner 160. Thereafter, a residual latent image on photosensitive drum 70 is erased by a discharge lamp 162 to restore the drum to its initial state. A cooling fan 164 for preventing the temperature inside the housing from rising is arranged at a lower, right portion of fixing unit 130.

A control panel 200, shown in FIG. 5, is mounted on the housing of copying machine 2. Control panel 200 is used for setting copying conditions, and for setting up facsimile communication.

Control panel 200 carries thereon a copy key 201, keys 202, a function clear key 204 for setting the standard status, an energy saver key 206 for going into the energy-saving mode, an interrupt key 208 typically used to allow making a copy of a different original during a multicopy run, and a clear/stop key 210. Copy key 201 is for starting the copying operation in a copying mode and for starting the facsimile operation in a facsimile mode. Keys 202 are for inputting the number of copies to be made in the copying mode, and for inputting a telephone number of a receiver in the facsimile mode. Clear/stop key 210 is for clearing the number of copies entered or stopping a multicopy run in the copy mode, and for clearing the telephone number entered in the facsimile mode.

Control panel 200 is further provided with a density setting section 212, an editing key 214 for setting the trimming mode or masking mode and modifying characters in the copying mode, operation guide keys 216 which includes a YES key, a NO key, and a HELP key, for asking the appropriate operation procedure and answering the questions from copying machine 2, and zoom keys 218 for adjustably setting the enlargement or reduction ratio in the copying mode. Density setting section 212 is for setting the copy density in the copying mode, and for setting one of a superfine mode, a fine mode, and a standard mode in the facsimile mode. In this embodiment, even if a predetermined enlargement or reduction ratio is set by zoom key 218, lens block 54 in image-scanning portion 6 does not move. For changing the magnification between an original image and a copy image, image data based on the signal output from CCD sensor 56 is changed by the software.

Additionally arranged on control panel 200 is an original size key 220 for setting an original size, a copy size key 222 for selecting the paper sheet size in the copying mode, an automatic paper selection key 224 for automatically detecting the size of the original placed on platen 10 and selecting a paper sheet of the same size as the original in the copying mode, an automatic-magnification selection key 226 for automatically detecting the size of an original placed on the platen 10 and calculating the correct enlargement or reduction ratio 228 in the copying mode, and a display section 228 for indicating conditions of the individual parts. Display section 228 is preferably a liquid crystal display.

Control panel 200 is provided with a cassette selection key 230 for alternatively selecting paper cassette 92, 98, 100 and 102, large-capacity feeder 96, and paper tray 94. Control panel 200 also has a mode-switching key 232. Mode-switching key 232 is for switching the mode of copying machine 2 from the copying mode to the facsimile mode, or from the facsimile mode to the copying mode.

A control system of copying machine 2 is described in detail below. The control system can be placed at a convenient location. By way of illustration, and not limitation, the control system is disclosed in the context of several processing units or CPUS. Any appropriate arrangement of one or more CPUs could be employed.

Figure 6A:
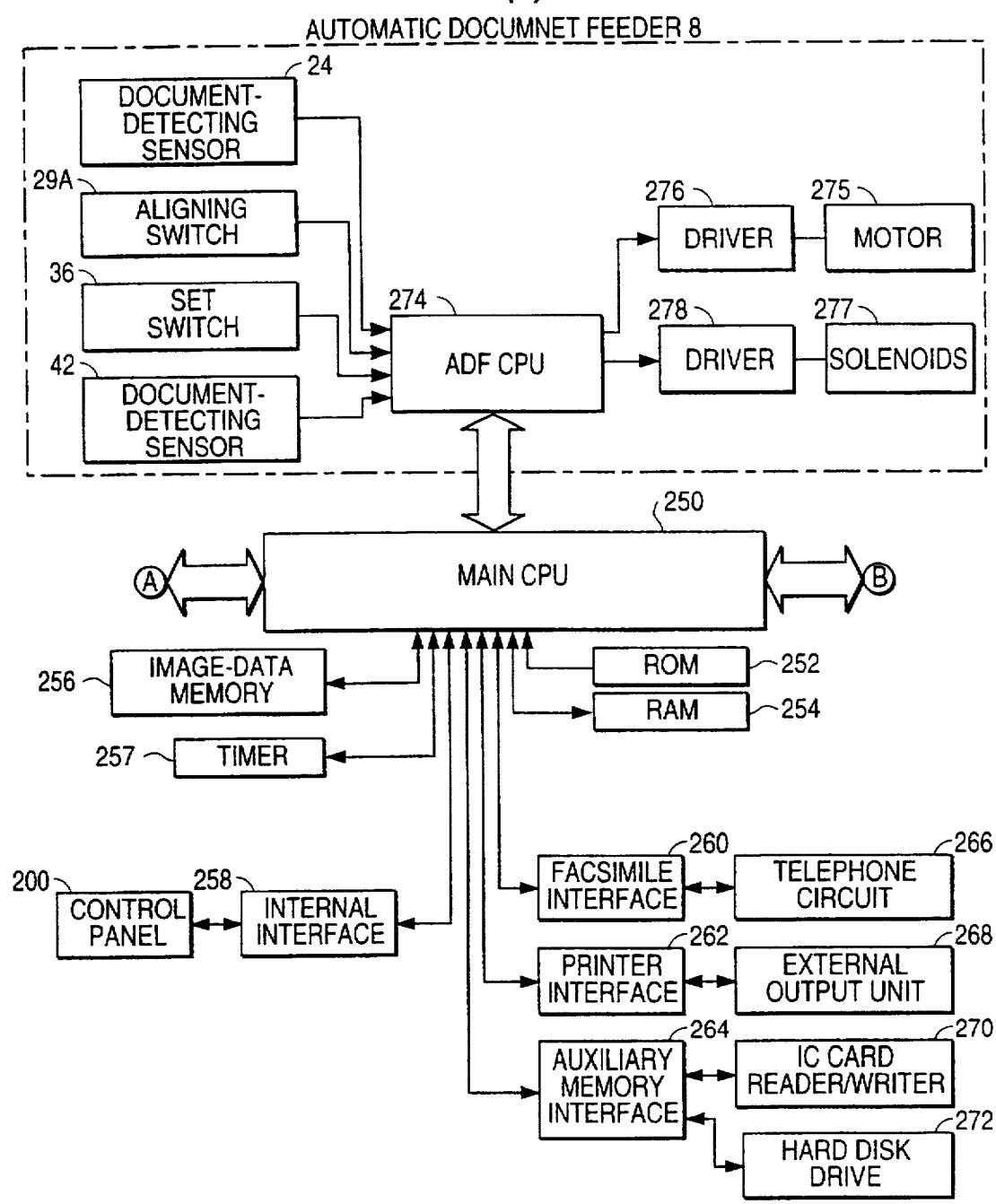
FIGS. 6(a), 6(b) and 6(c) are block diagrams showing the arrangement of a control section of the copying machine.

As shown in FIG. 6(a), the control system has a main CPU 250 which controls the control system. A read only memory (ROM) 252 stores a control program. CPU 250 operates in accordance with the control program. A random access memory (RAM) 254 is used as a work buffer for CPU 250. A means for receiving the image data, such as image-data memory 256, is used as a page buffer for temporarily storing image data from an external device through a telephone circuit, or image-scanning portion 6. If copying machine 2 is set to make a plurality of copies from one original by an operator, then image-scanning portion 6 performs the image-scanning operation once and stores the image data in image-data memory 256. Next, image-forming portion 4 makes the required number of copies by using the image data stored in image-data memory 256. Also, copying machine 2 may perform a so-called electric sorting operation because copying machine 2 has image-data memory 256. The electric sorting operation is a non-mechanical sorting of sheets P, which is performed by retrieving from the image-data memory 256, the data needed for image-forming operations according to a selected order of pages, for example, as selected by an operator.

A timer 257 connects to main CPU 250 to output a predetermined signal when a predetermined time period has elapsed which has been set, e.g., by an operator.

Main CPU 250 connects to an internal interface 258, a data transmission interface device, such as a facsimile interface 260, a printer interface 262, and an auxiliary memory interface 264. The construction of such interfaces is known in the art. Internal interface 258 exchanges signals between main CPU 250 and control panel 200. Facsimile interface 260 exchanges image data between main CPU 250 and telephone circuit 266. Printer interface 262 exchanges image data between main CPU 250 and an external output unit 268, e.g., a computer or a word processor. Auxiliary memory interface 264 exchanges image data between main CPU 250 and an IC card reader/writer 270 and/or a hard-disc drive 272.

Main CPU 250 connects to an ADF (automatic document feeder) CPU 274, which controls automatic-document feeder 8 through signal lines. ADF CPU 274 connects to document-detecting sensor 24, aligning switch 29A, set switch 36, document-detecting sensor 42, a motor 275 through a driver 276, and solenoids 277 though a driver 278. The automatic document feeder includes a transport mechanism for originals having, for example, motor 275 and solenoids which drive the rollers in automatic-document feeder 8, and gate 46.

Figure 6B:
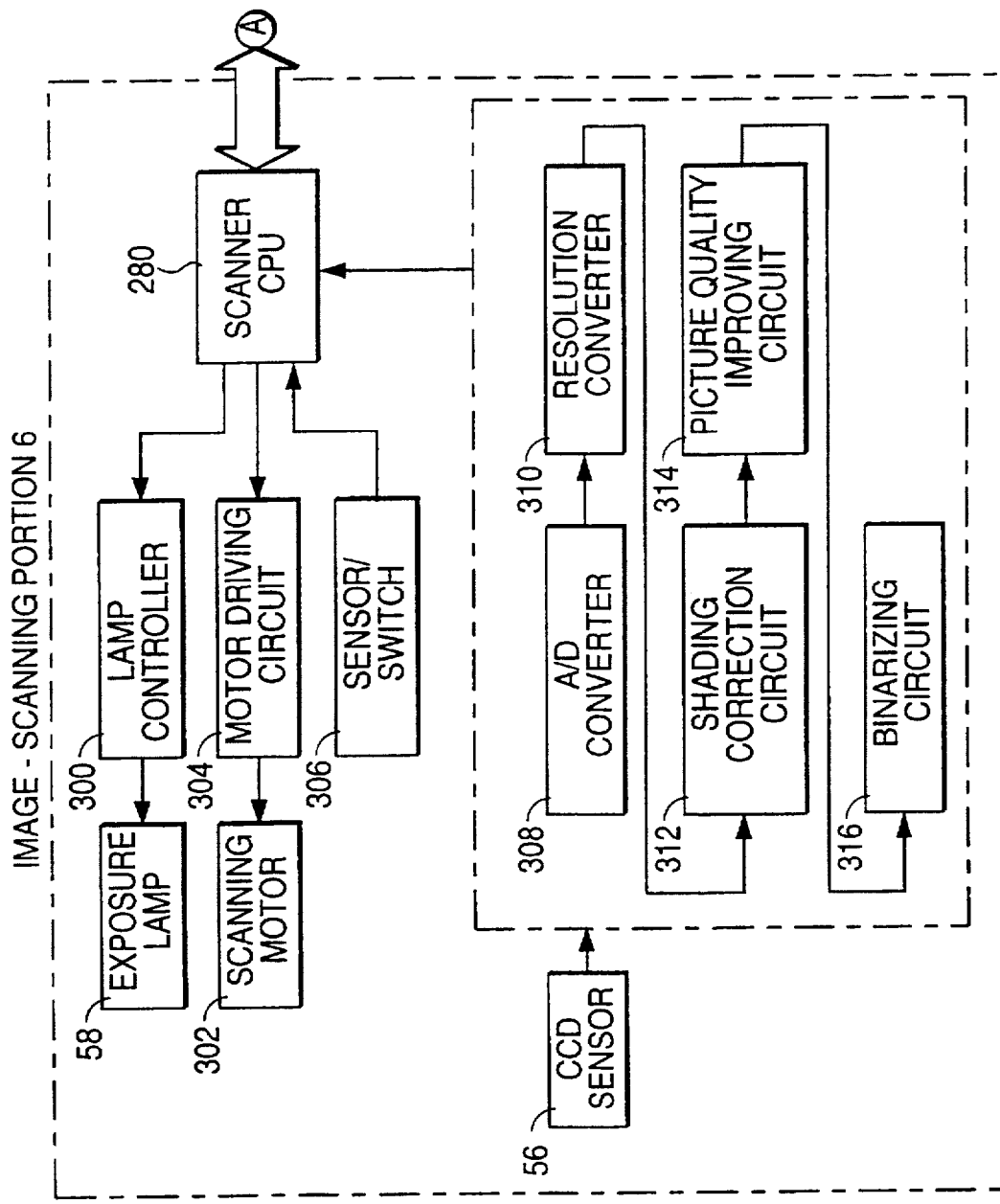
Figure 6C:
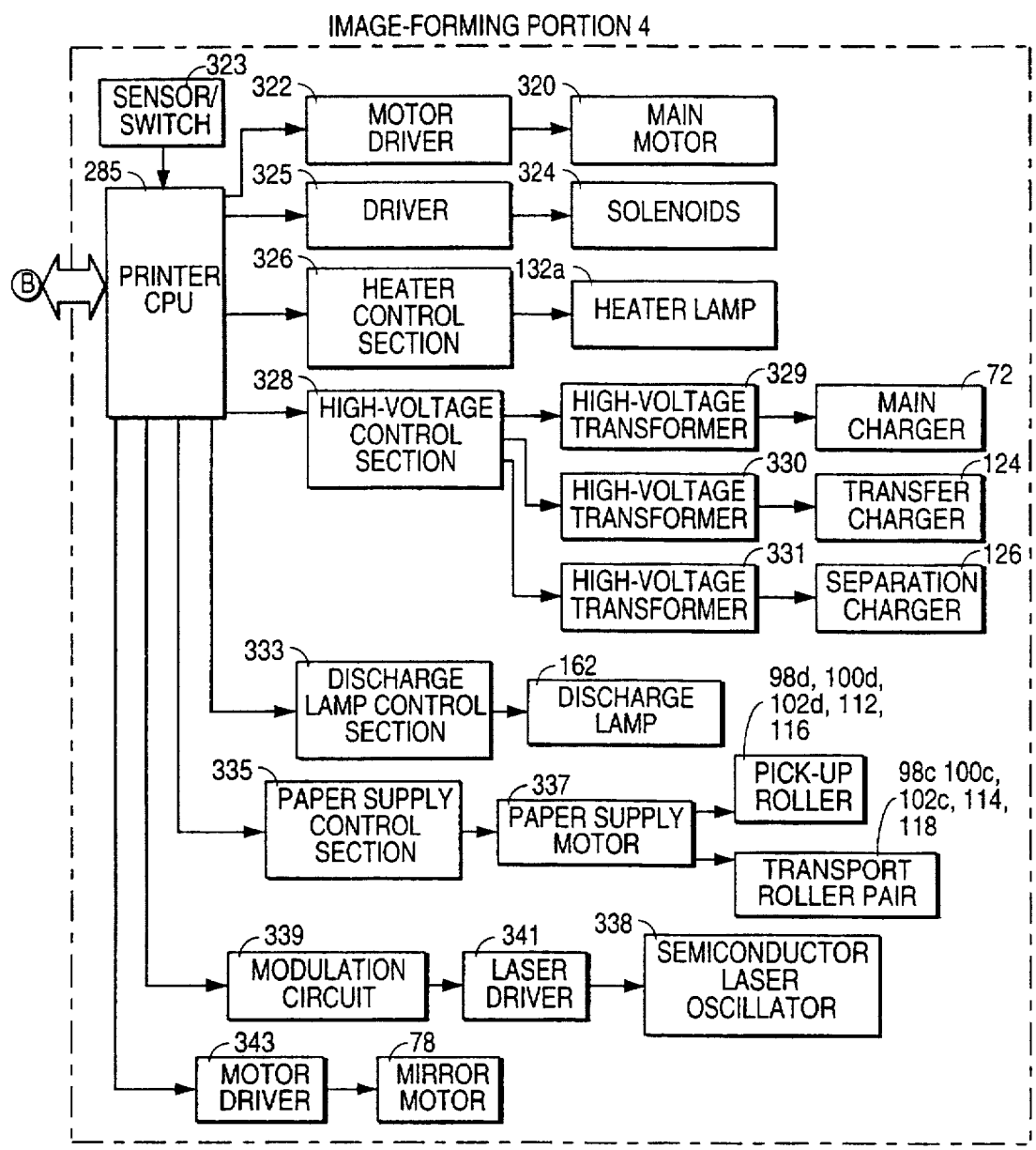

Main CPU 250 also connects to a scanner CPU 280 and a printer CPU 285 as shown in FIG. 6(b) and FIG. 6(c).

Scanner CPU 280 connects to exposure lamp 58 via a lamp controller 300 for controlling exposure lamp 58, a scanning motor 302 via a motor driving circuit 304 for controlling scanning motor 302, and an input device 306 including sensors and switches. Scanning motor 302 moves first carriage 50 and second carriage 52 reciprocally.

Furthermore, scanner CPU 280 connects to CCD sensor 56, an A/D converter 308, a resolution converter 310, a shading correction circuit 312, a picture quality improving circuit 314, and a binarizing circuit 316. A/D converter 308 converts the electric signals output by CCD sensor 56 into digital data. Resolution converter 310 converts the resolution of CCD sensor 56 into that of image-forming portion 4 in order to process signals in accordance with the degree of magnification or reduction ratio. The digital signals output by resolution converter 310, are subjected to shading correction in shading correction circuit 312.

Picture quality improving circuit 314 subjects the output signals from shading correction circuit 312 to an edge emphasis and a γ correction. Binarizing circuit converts the output signals from picture quality improving circuit 314 into binary signals and transfers the binary signals to scanner CPU 280.

Printer CPU 285 shown in FIG. 6(c) connects to a main motor 320, via a motor driver 322 for driving main motor 320, an input device 323 including sensors and switches, solenoids 324 arranged in image-forming portion 4 via a driver 325, and heater lamp 132a via a heater control section 326. Main motor 320 drives photosensitive drum 70, developing roller 90a, conveyer belt 128, heat roller 132, and exit roller pair 138. Printer CPU 285 connects to a high-voltage control section 328 which connects to main charger 72 via a high-voltage transformer 329, transfer charger 124 via a high-voltage transformer 330, and separation charger 126 via a high-voltage transformer 331. Also, printer CPU 285 connects to discharge lamp 162 via discharge lamp control section 333, and pick-up rollers 98c, 100c, 102c, 112, and 116, and transport roller pairs 98d, 100d, 102d, 114, and 118 via a paper supply control section 335 and a paper-supply motor 337. Furthermore, printer CPU 285 connects to semiconductor laser oscillator 338 via a modulation circuit 339 for modulating the laser beam in correspondence to image data and a laser driver 341, and mirror motor 78 via a motor driver 343.

According to the arrangement, each copying operation, facsimile operation, and printing operation is performed as described further herein.

COPYING OPERATION

When copy key 201 is depressed in the copying mode, exposure lamp 58 radiates original D through platen 10. The light reflected from original D, which is exposed by exposure lamp 58, illuminates CCD sensor 56 via mirrors 62, 64 and 66 and lens block 54. At this time, first carriage 50 supporting exposure lamp 58, and second carriage 52 are moved a predetermined length corresponding to the original size in the direction of arrow RD by scanning motor 302. First carriage 50 and second carriage 52 are positioned to an initial position by using the output of sensor 306.

CCD sensor 56 outputs electric signals corresponding to the light intensity. A/D converter 308, resolution converter 310, shading correction circuit 312, picture quality improving circuit 314, and binarizing circuit 316 make binarized image data based on electric signals output from CCD sensor 56. Scanner CPU 280 stores the image data to image-data memory 256 via main CPU 250.

Image-forming portion 4 rotates photosensitive drum 70 by using main motor 320. After the surface of photosensitive drum 70 is wholly charged by main charger 72, the charged surface is exposed by laser beam LB from laser unit 74. Laser beam LB, which laser unit 74 outputs, is based on the image data stored in image-data memory 256, and is made by modulation circuit 339, laser driver 341, and semiconductor laser oscillator 338. Next, laser beam LB is reflected by polygon mirror 76, which mirror motor 78 drives, and is supplied to the surface of photosensitive drum 70 as a line image. Thus, the electrostatic latent image is formed thereon. Then, the electrostatic latent image is developed into a toner image by developing unit 90. Transfer charger 124 transfers the toner image to paper sheet P, which is transported to transfer region TR. Separation charger 126 separates paper sheet P with the toner image from the surface of photosensitive drum 70. After that, paper sheet P with the toner image is transported to fixing unit 130. After fixation, paper sheet P is discharged into tray 136.

FACSIMILE OPERATION

When copy key 201 is depressed in the facsimile mode after a telephone number is input, image-scanning portion 6 provides image data on the basis of an original D placed on platen 10, as during the copying operation. Then, main CPU 250 transmits the image data to the destination machine through a data transmission interface device, such a facsimile interface 260, and telephone circuit 266.

When copying machine 2 receives image data from another machine through telephone circuit 266, first, main CPU 250 receives an input signal indicating telegraphic communication from telephone circuit 266 through facsimile interface 260. Next, main CPU 250 receives the image data. Image-forming portion 4 forms an image corresponding to the image data, as in the copying operation. If telephone circuit 266 is busy when copying machine 2 transmits image data to another machine, or image-forming portion 4 is busy when copying machine 2 receives image data from another machine, then main CPU 250 stores the image data to image-data memory 256 temporarily. After those portions are usable, main CPU 250 performs the additional operations using the image data stored in image-data memory 256, as described further herein.

PRINTING OPERATION

When main CPU 250 receives image data from external output unit 268 through printer interface 262, main CPU 250 transmits the image data to image-forming portion 4. Image-forming portion 4 forms an image corresponding to the image data, as during the copying operation. If image-forming portion 4 is busy when copying machine 2 receives image data, then main CPU 250 stores the image data to image-data memory 256 temporarily. After image-forming portion 4 becomes available, main CPU 250 controls image forming portion 4 to perform the following operation by using the image data stored in image-data memory 256.

Copying machine 2 described as above, automatically chooses a suitable mode either in the copying mode or the facsimile mode when automatic-document feeder 8 is used. As for the choice of the suitable mode, the operation of copying machine 2 will be described in detail referring to FIGS. 7(a) to 7(c).

When copying machine 2 is in the stand-by condition, if copy key 201 is depressed by an operator, main CPU 250 checks whether document-detecting sensor 24 is turned on (steps ST 1 and ST 2). Document-detecting sensor 24 is turned on when original D is placed on tray 16. If main CPU 250 determines that document-detecting sensor 24 is not turned on, then main CPU 250 performs the copying operation or the facsimile operation in accordance with the mode which is set in advance (steps ST 3, ST 4, and ST 5).

If main CPU 250 determines that document-detecting sensor 24 is turned on, then main CPU 250 makes scanner CPU 280 move first carriage 50 and second carriage 52 to the image-reading area at which original D is scanned on platen 10, and makes scanner CPU 280 turn on exposure lamp 58 (step ST 6). At that time, main CPU 250 makes ADF CPU 274 transport the lowest one of the sheets of the originals D on tray 16 onto platen 10 (step ST 7). While automatic-document feeder 8 transports original D, main CPU 250 checks whether there is an image to be read on the surface of original D, namely, whether the surface facing platen 10 is the front side (step ST 8), as discussed further herein. In conjunction with these elements, main CPU 250 then acts as a means for detecting whether the copying mode or facsimile mode for data transmission is to be activated. If main CPU 250 determines that there is an image on the surface facing platen 10, then main CPU 250 sets the copying mode irrespective of the setting of mode-switching key 232, and makes scanner CPU 280 turn off exposure lamp 58 (step ST 9). Because this condition indicates that original D is placed on tray 16 as shown in FIG. 3(a), main CPU 250 makes display section 228 display a message, such as "IS COPYING MODE RIGHT?" (Step ST 10). If the NO key in operation guide key or mode-switching key 232 is not depressed within 5 seconds, as counted by timer 257 after the display is started, main CPU 250 makes scanner CPU 280 move first carriage 50 and second carriage 52 to a home position from which first carriage 50 starts the scanning operation, and makes scanner CPU 280 position original D to the image-reading area (steps ST 11, ST 12, ST 13, and ST 14).

When automatic-document feeder 8 positions original D at the image-reading area, first ADF CPU 274 drives document-conveying belt 30 so that original D moves from the left side to right side in FIG. 1. After set switch 36 detects the trailing edge of original D, ADF CPU 274 drives document-conveying belt 30 in the reverse direction, which is from the right side to the left side in FIG. 1, for a predetermined time period. Finally, the leading edge of original D in the reverse direction hits scale 12, and original D is positioned.

After step ST 14, main CPU 250 performs the copying operation, as described above (step ST 15). After the copying operation, if main CPU 250 determines that document-detecting sensor 24 is turned on, main CPU 250 makes ADF CPU 274 discharge the scanned original to discharge portion 18A, and makes ADF CPU 274 transport the next original onto the image-reading area (steps ST 16 and ST 17). Then, the flow returns to step ST 15. This operation continues to run until there are no more originals D on tray 16.

On the other hand, if main CPU 250 determines at step ST 8 that there is no image on the surface facing platen 10, then main CPU 250 sets the facsimile mode irrespective of the setting of mode-switching key 232, and makes scanner CPU 280 turn off exposure lamp 58 (step ST 19). Because this condition indicates that originals D are placed on tray 16 as shown in FIG. 3(b), main CPU 250 makes display section 228 display a message such as "IS FACSIMILE MODE RIGHT?" (step ST 20). If the NO key in operation guide key or mode-switching key 232 is not depressed within 5 seconds after the display is started, main CPU 250 makes scanner CPU 280 move first carriage 50 and second carriage 52 to a home position from which first carriage 50 starts the scanning operation as described in steps ST 11 to ST 13, and makes scanner CPU 280 position original D to the image-reading area after turning it over (steps ST 21, ST 22, ST 23, and ST 24).

After step ST 24, main CPU 250 performs the facsimile operation as described above (step ST 25). After the facsimile operation, if main CPU 250 determines that document-detecting sensor 24 is turned on, main CPU 250 makes ADF CPU 274 discharge the scanned original to discharge portion 18A, and makes ADF CPU 274 transport the next original onto the image-reading area after turning it over (steps ST 26 and ST 27). Then, the flow returns to step ST 25. This operation continues to run until there are no more originals D on tray 16.

In the meantime, if main CPU 250 determines at either step ST 11 or ST 21 that the NO key or mode-switching key 232 is depressed within 5 seconds, then main CPU 250 controls ADF CPU 274 to discharge original D placed on platen 10 to discharge portion 18A (step ST 28). After that, main CPU 250 controls display section 228 to display a message "UPSIDE DOWN ORIGINALS" (step ST 29). If document-detecting sensor 24 then turns off, main CPU 250 determines that an operator has taken out originals D to turn them upside down, and returns to step ST 1 (step ST 30).

Figure 7A:
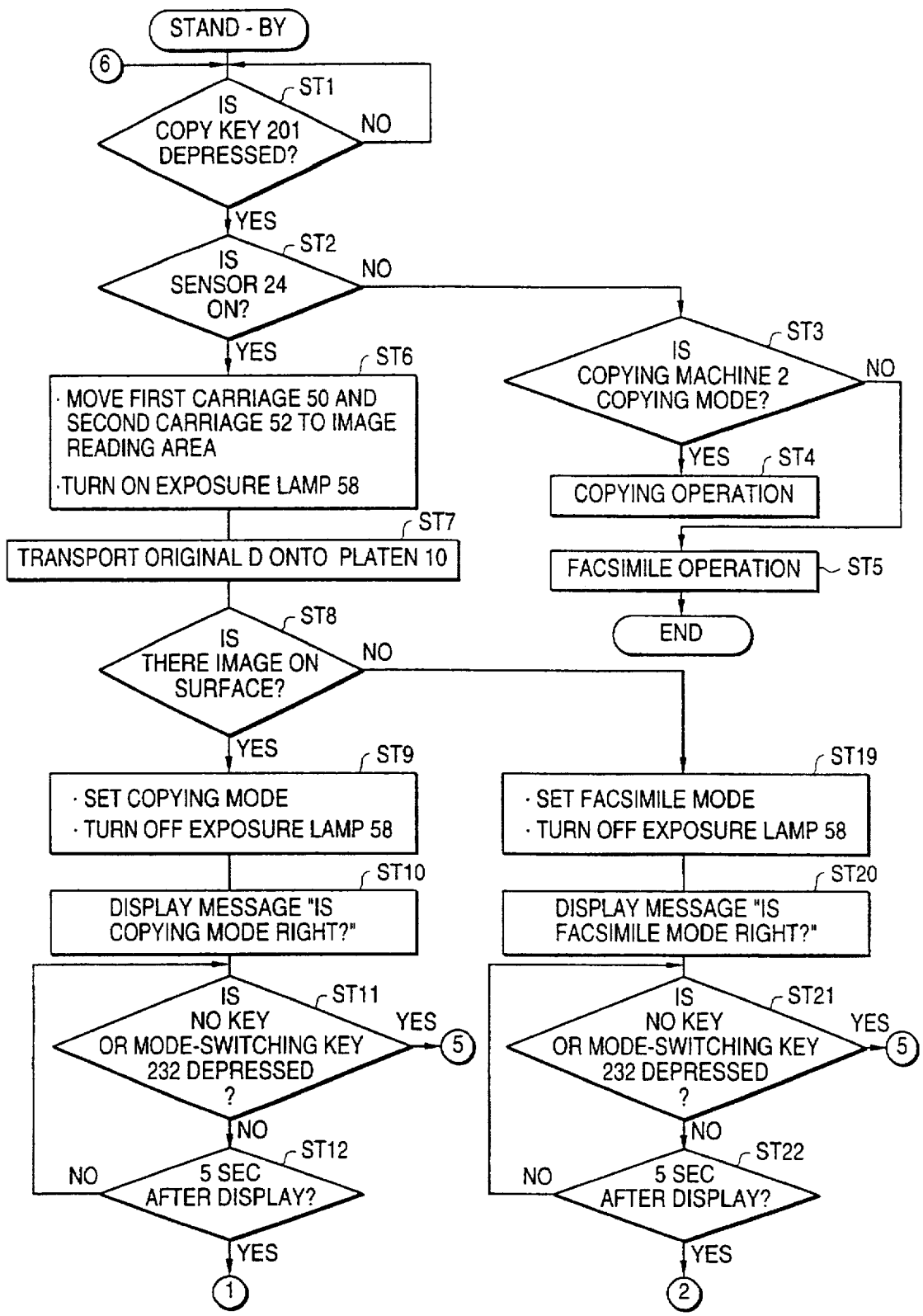
Figure 7B:
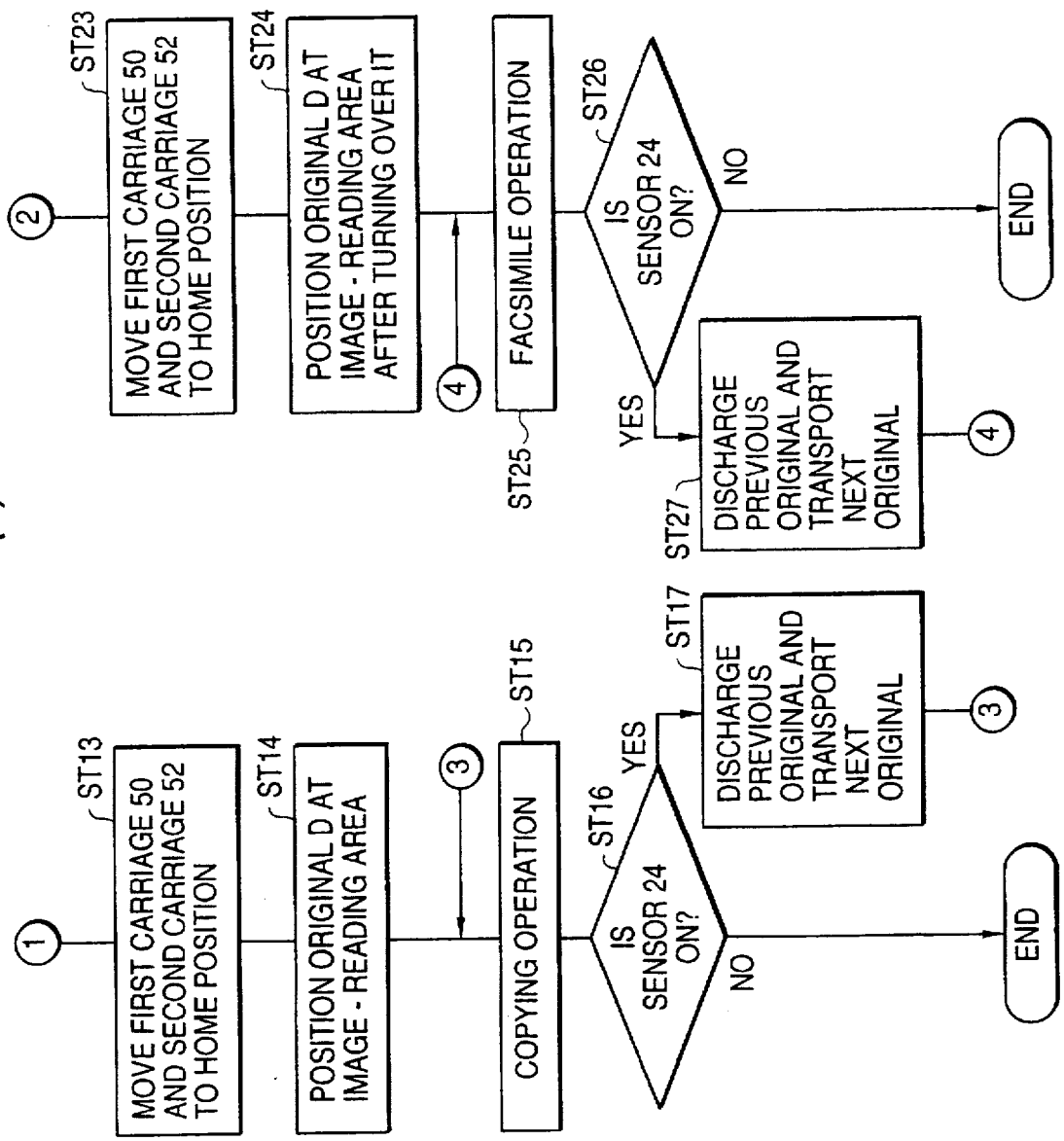

As shown at step ST 6 in FIG. 7(a), first carriage 50 and second carriage 52 are moved to the image-reading area in advance of when main CPU 250 checks whether there is an image on the surface of original D facing platen 10. The object is to complete this checking in a short time. Before image-scanning portion 6 using CCD sensor 56 reads an original image, main CPU 250 presets a correction amount of shading using correction circuit 312. The correction amount has two kinds of reference levels, a white level and a black level. The black level is set using the reading level of CCD sensor 56 when exposure lamp 58 is OFF. The white level is set using the reading level of CCD sensor 56 at which a reflected light from shading correction reference plate 67 is provided when exposure lamp 58 is ON. Shading correction reference plate 67 has a reference white color. In this time, first carriage 50 and second carriage 52 are in positions close to their home positions, because shading correction reference plate 67 is arranged at the upstream of platen 10 which is the image-reading area, as shown in FIG. 4. Thus, first carriage 50 and second carriage 52 must be moved into the image-reading area for main CPU 250 to determine whether there is an image on the surface of original D facing platen 10.

In this embodiments according to the invention, the original feeding speed of automatic-document feeder 8 is made faster than the image scanning speed of first carriage 50 and the image reading speed of CCD sensor 56 when main CPU 250 checks whether there is an image on the surface of original D facing platen 10. This is accomplished by ADF CPU 274 causing the belt driving mechanism to drive document conveying belt 30 at a higher speed. In the image scanning, first carriage 50 and second carriage 52 are moved and an original D is read by CCD sensor 56. The image scanning speed of first carriage 50 and the image reading speed of CCD sensor 56 are limited by the carriage vibration, carriage inertia, and reading frequency of CCD sensor 56. In contrast, when main CPU 250 checks whether there is an image on the surface of original D facing platen 10, it is only necessary to determine whether there is anything (normally, black) other than a color of original D (normally, white), such as a character, a picture, and the like, on the surface. For this purpose, image reading by CCD sensor 56 can be performed at a high speed, if portions are skipped thus using image reading signals which are "thinned." Since first carriage 50 and second carriage 52 themselves do not move at this time, the image reading speed can be made higher than the normal image reading speed. As a result, it becomes possible to reduce the operating time needed for determining the presence or absence of an image by reducing the time loss. In this embodiment, the image reading speed is equivalent to the original feeding speed, because automatic-document feeder 8 is used. Thus, it is possible and effective to increase the original feeding speed to a rate higher than the normal image reading speed.

Figure 8:
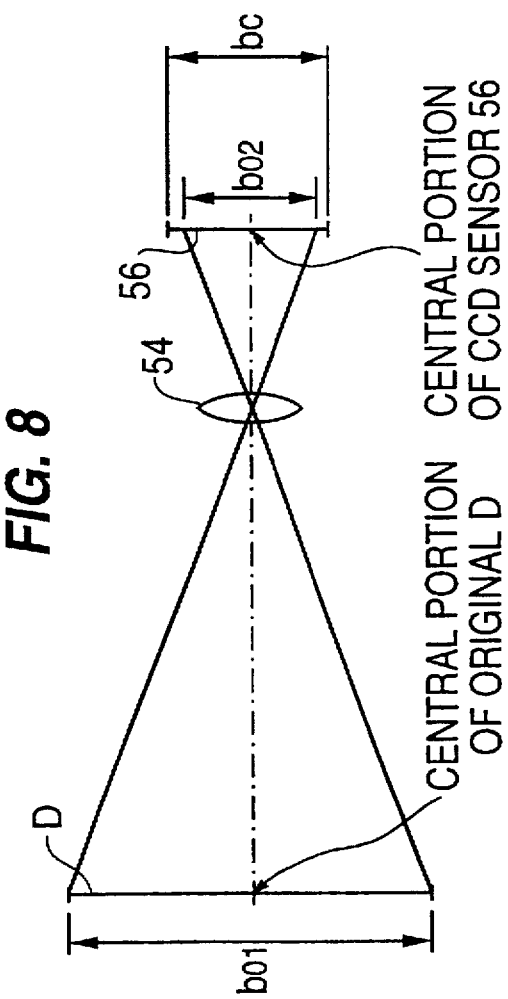
FIG. 8 is an illustrative diagram showing a placement of a CCD sensor.

As the image reading signals are thinned by scanner CPU 280 when main CPU 250 checks whether there is an image on the surface of original D, it becomes possible to reduce the operating time needed for determining whether or not there is image. Generally used CCD sensors are typically of the 300 DPI (11.8 dots/mm) or 400 DPI (15.7 dots per/mm) type. Each CCD sensor reads 11.8 or 15.7 dots per/mm. There are few characters/pictures having only $1/11.8$ or $1/15.7$ dots per 1 mm on an original D. Thus, when main CPU 250 checks whether there is image, it is only necessary to see if there are dots or lines on a portion of an original surface. For instance, only the number of dots per 1 mm is read. In this way, the image reading signals are "thinned" to fewer data signals than are needed to read the entire image. This allows the time for determining whether there is an image to be reduced because less data is used than the data available in the entire image. For example, if the image reading signals are thinned to once, per 1 mm, then the time to determine the presence of an image will be reduced by 12–16 times of the normal reading speed. If CCD sensor 56 in this embodiment is of 300 DPI, the image reading signals are thinned to once per 1 mm. A width of CCD sensor 56 is selected so that an effective width bc of CCD sensor 56 is equal to or more than an original width $bo_2$ irradiated onto the surface of CCD sensor 56 through lens block 54, as shown in FIG. 8. Furthermore, CCD sensor 56 is arranged at image-scanning portion 6 so that a central portion of CCD sensor 56 corresponds to a central portion of original D properly placed on platen 10. A distance $bo_1$ in FIG. 8 represents an original width of original D. Thus, the magnification m of lens block 54 is represented by $bo_2/bo_1$ ($\leq 1$).

When main CPU 250 determines that there is an image on the surface during the checking operation, the checking operation is stopped at that time, and the flow advances to step ST 9. That is, in checking whether there is image, it is only necessary to determine the existence of an image on the surface. When, for instance, main CPU 250 determines that there is image in the first several millimeters on an A3 size original, it is not necessary to feed the remainder of the original. The flow advances to the next step at that time, thus avoiding wasted time.

Figure 9:
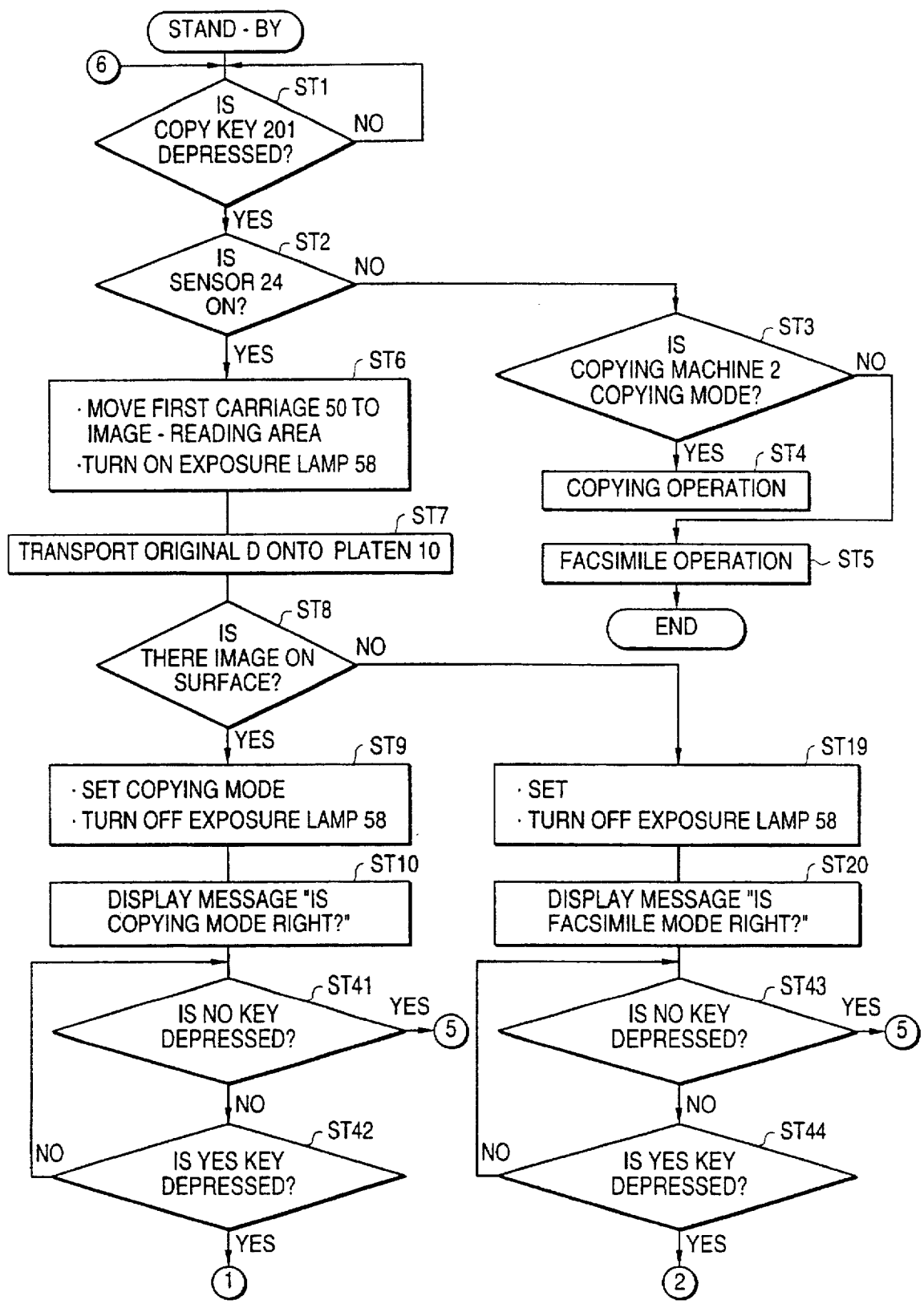
FIG. 9 represents a flow chart showing an operation of a control system of a second embodiment.

FIG. 9 shows a second embodiment of the operation of the control system. In this embodiment, timer 256 is not used after step ST 10 and step ST 20. When either the YES key or the NO key is depressed, the flow advances to one of step ST 13 and step ST 23 (step ST 40, St 41, St 42, and ST 43).

Figure 10:
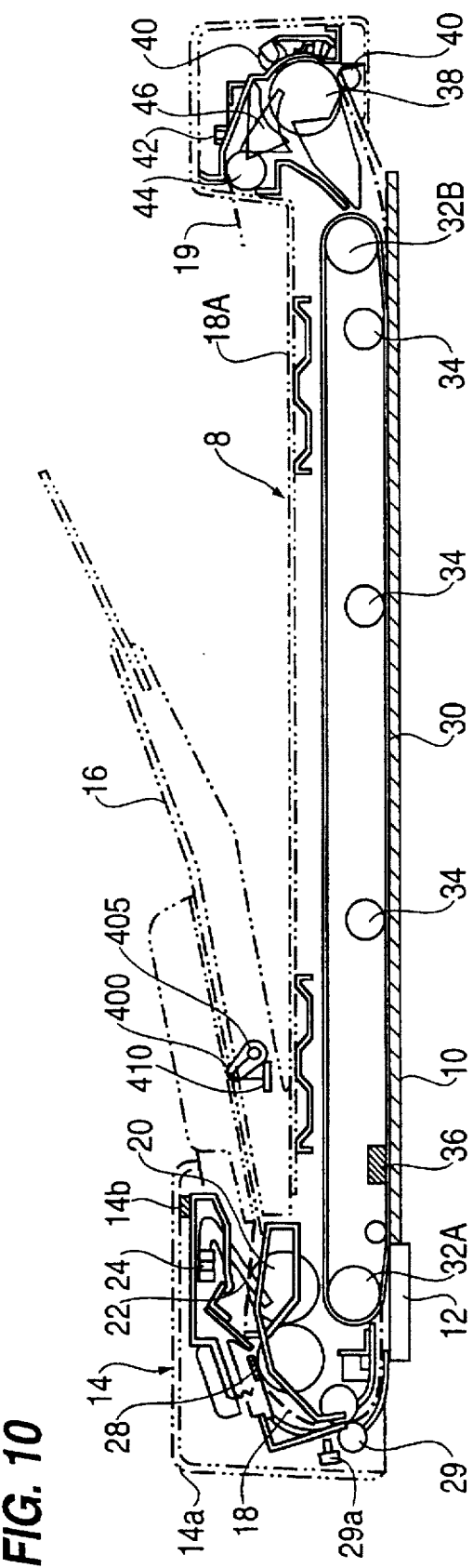
FIG. 10 is a sectional view showing the arrangement of an automatic-document feeder of a third embodiment.
Figure 11A:
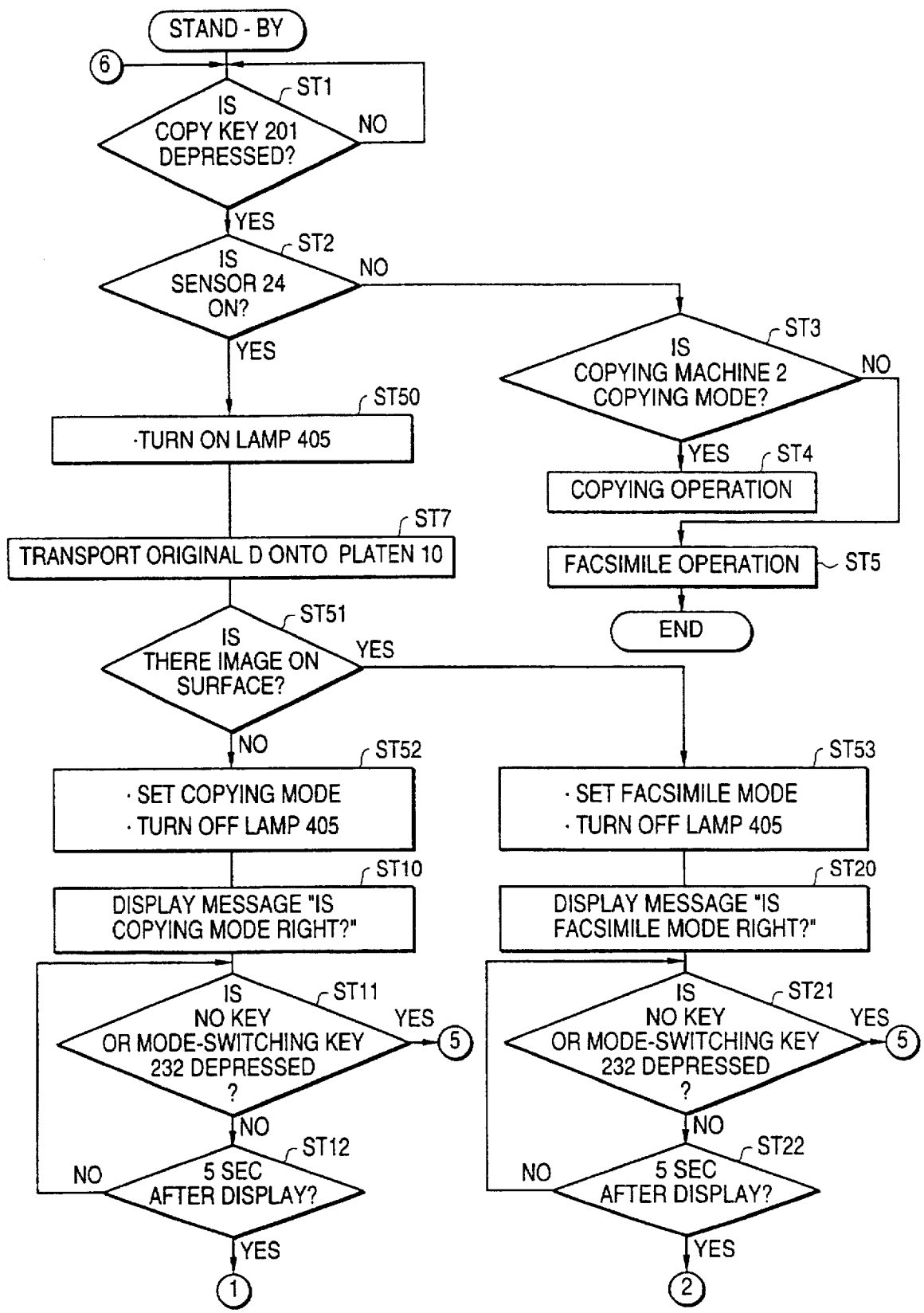
FIGS. 11(a) and 11(b) represent a flow chart showing an operation of a control system of the third embodiment.
Figure 11B:
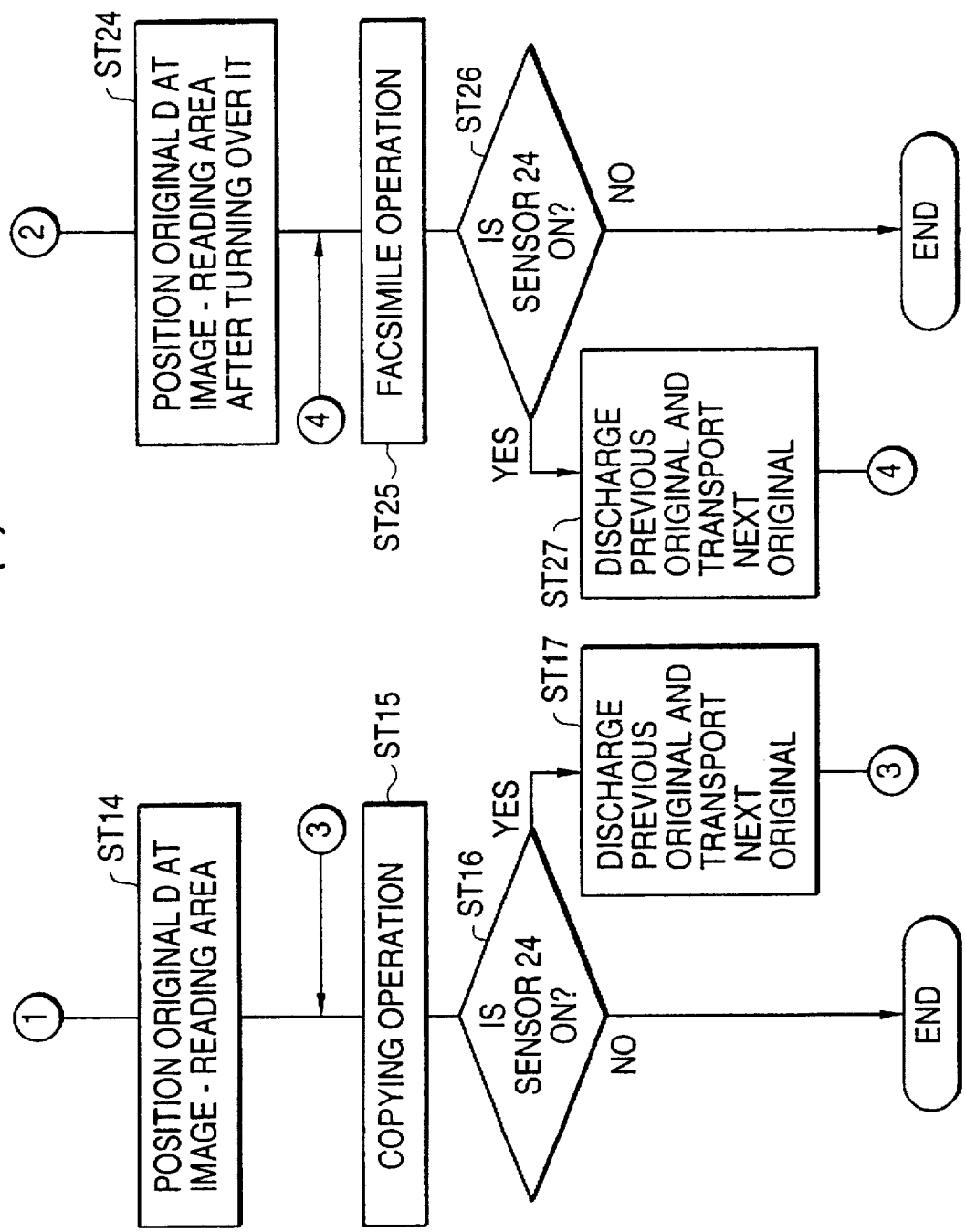

FIGS. 10, 11(a) and 11(b) show a third embodiment of automatic-document feeder 8 and the operation of the control system according to the invention. In this embodiment, an opening 400 is formed in tray 16, and a lamp 405 and a CCD sensor 410 are arranged near opening 400. Lamp 405 irradiates a light to original D placed on tray 6 through opening 400. CCD sensor 410 receives light reflected by original D through opening 400, and outputs signals corresponding to the reflected light. Main CPU 250 determines whether there is an image on the surface of original D facing tray 16. The surface of original D read by CCD sensor 410 is opposite to that of the first embodiment. CCD sensor 410 may be longer than the whole width of an original D or shorter than the width of an original D, and is positioned near the central portion of the width an original properly placed on tray 16.

As shown in FIGS. 11(a) and 11(b), if main CPU 250 determines at step 2 that document-detecting sensor 24 is turned on, then main CPU 250 controls ADF CPU 274 to turn on lamp 405 (step ST 50). At that time, first carriage 50 and second carriage 52 do not move.

After step ST 7, main CPU 250 checks whether there is an image to be read on the surface of original D facing tray 16 (step ST 51). If main CPU 250 determines that there is no image on the surface, then main CPU 250 sets the copying mode irrespective of the setting of mode-switching key 232, and makes ADF CPU 274 turn off lamp 405 (step ST 52). On the other hand, if main CPU 250 determines at step ST 51 that there is image on the surface, then main CPU 250 sets the facsimile mode irrespective of setting of mode-switching key 232, and makes ADF CPU 274 turn off lamp 405 (step ST 53). Thus, the conditions causing activation of the copying or facsimile modes are the reverse of those in the embodiment in FIG. 7(a).

Moreover, main CPU 250 does not perform steps ST 13 and ST 23 in the first embodiment, because first carriage 50 and second carriage 52 were not moved in the first embodiment. The remaining steps and the other elements in this third embodiment are the same as those of the first embodiment.

Figure 12:
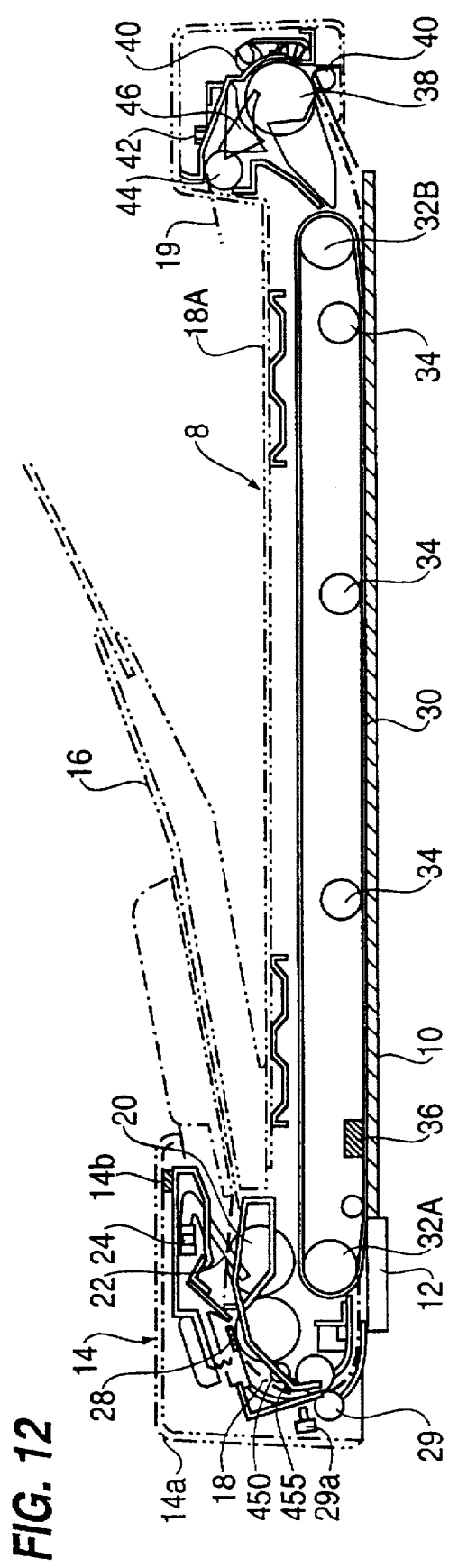
FIG. 12 is a sectional view showing the arrangement of an automatic document feeder of a fourth embodiment.

FIG. 12 shows a fourth embodiment of automatic-document feeder 8 according to the invention. In this embodiment, a lamp 450 and a CCD sensor 455 are arranged in the way of document-transport path 18. The other elements are the same as those of the third embodiment.

Figure 13:
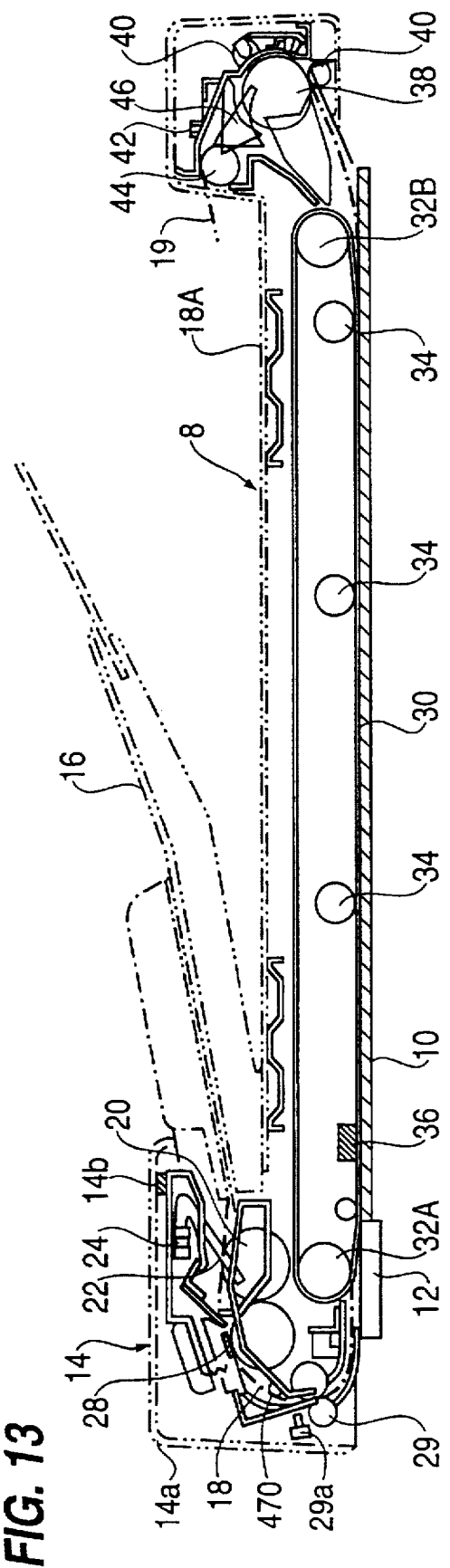
FIG. 13 is a sectional view showing the arrangement of an automatic-document feeder of a fifth embodiment.
Figure 14A:
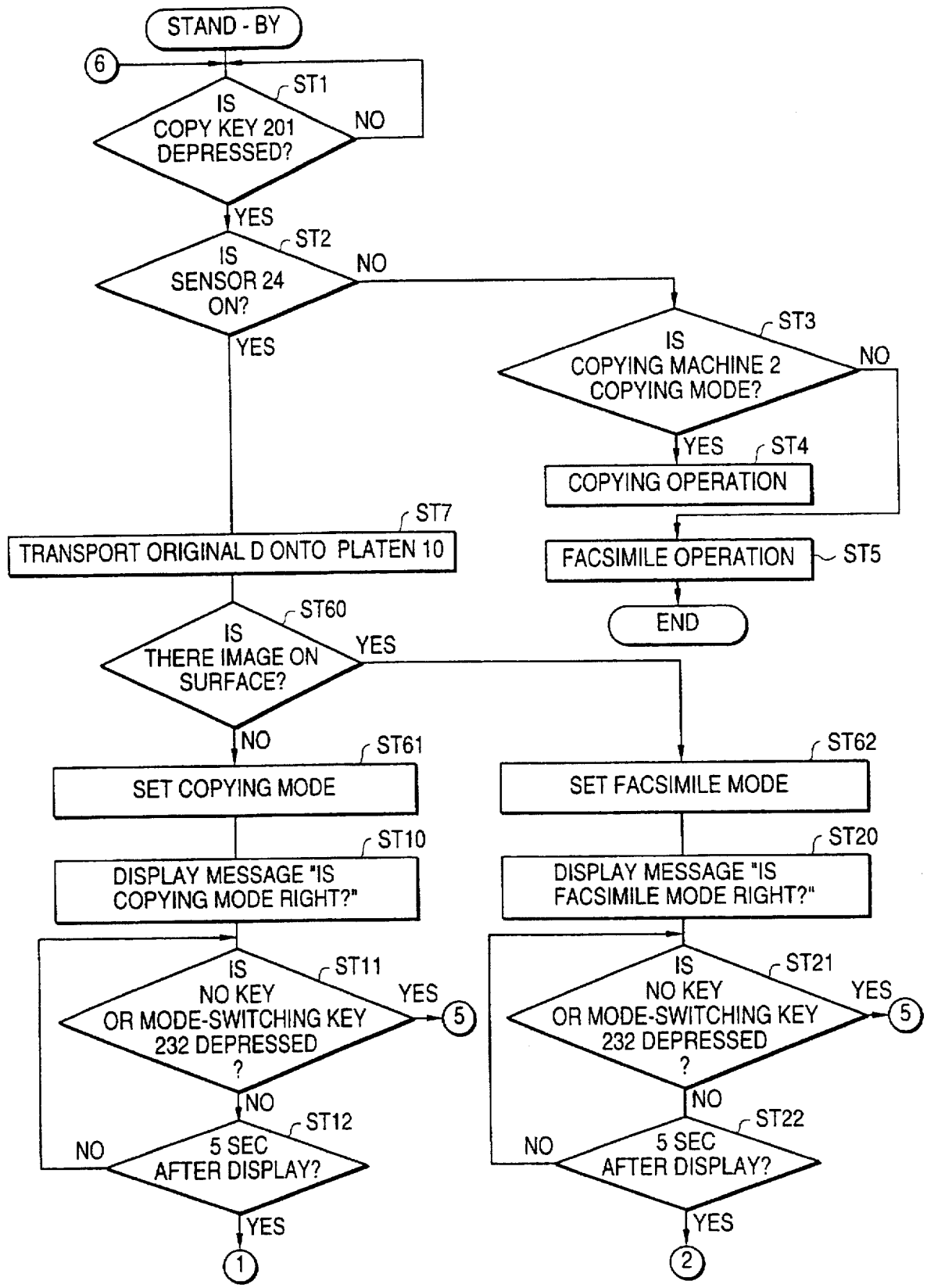
FIGS. 14(a) and 14(b) represent a flow chart showing an operation of a control system of the fifth embodiment.
Figure 14B:
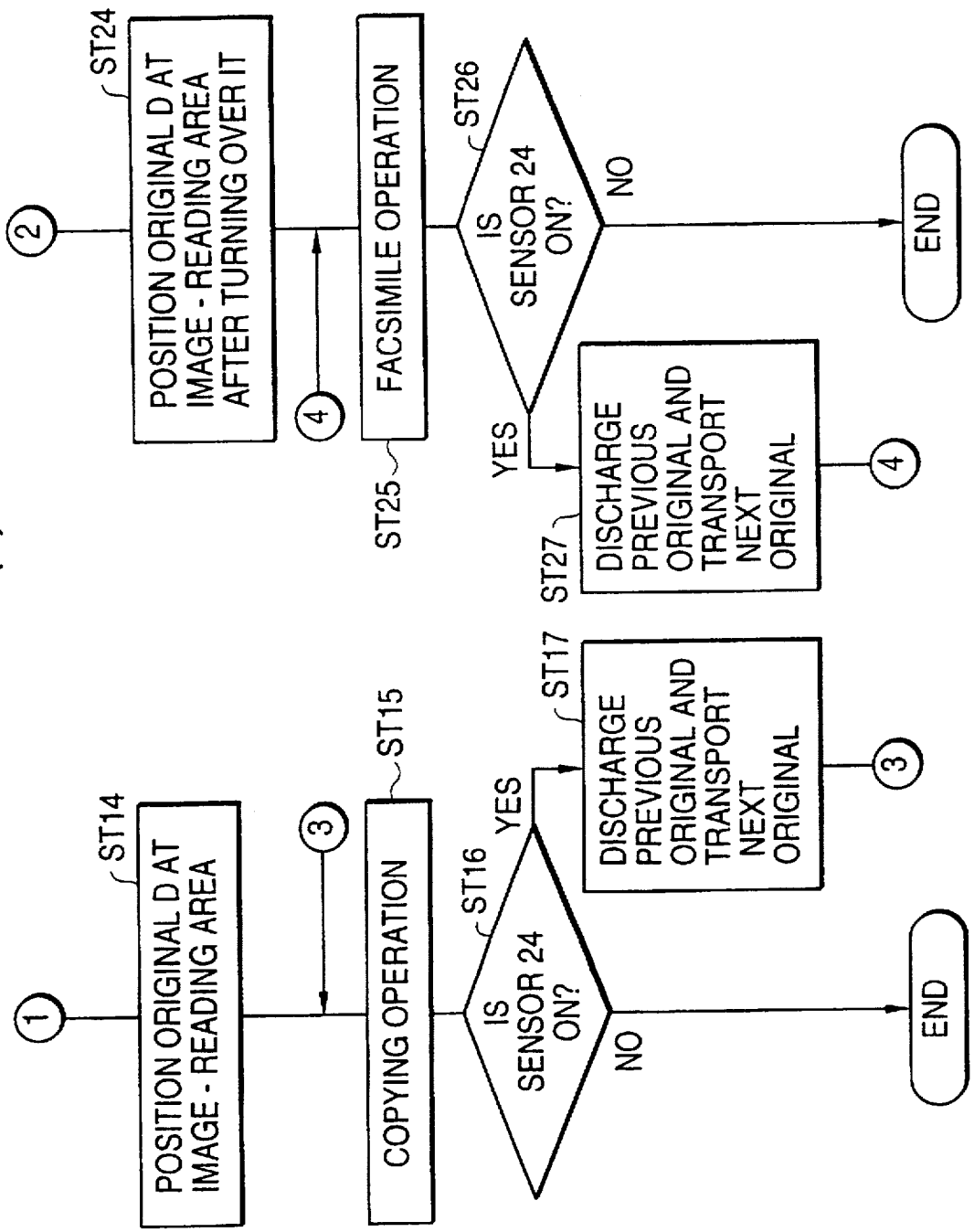

FIGS. 13, 14(a), and 14(b) show a fifth embodiment of automatic document feeder 8, and the operation of the control system according to the invention. In this embodiment, a photosensor 470 which is a photocoupler is arranged in the way of document-transport path 18 rather than the combination of lamp 450 and CCD sensor 455 of the fourth embodiment.

As shown in FIGS. 14(a) and 14(b), if main CPU 250 determines at step ST 2 that document-detecting sensor 24 is turned on, then the flow advances to step ST 4.

After step ST 7, main CPU 250 checks whether there is an image to be read on the surface of original D that is not facing platen 10 (step ST 60). If main CPU 250 determines that there is no image on the surface, then main CPU 250 sets the copying mode irrespective of setting of mode-switching key 232 (step ST 61). On the other hand, if main CPU 250 determines at step ST 60 that there is image on the surface, then main CPU 250 sets the facsimile mode irrespective of setting of mode-switching key 232 (step ST 62).

The other steps and the other elements of the fifth embodiment are the same as those of the first embodiment except that, as previously noted, main CPU 250 does not perform steps ST 13 and ST 23 in the first embodiment.

Figure 15A:
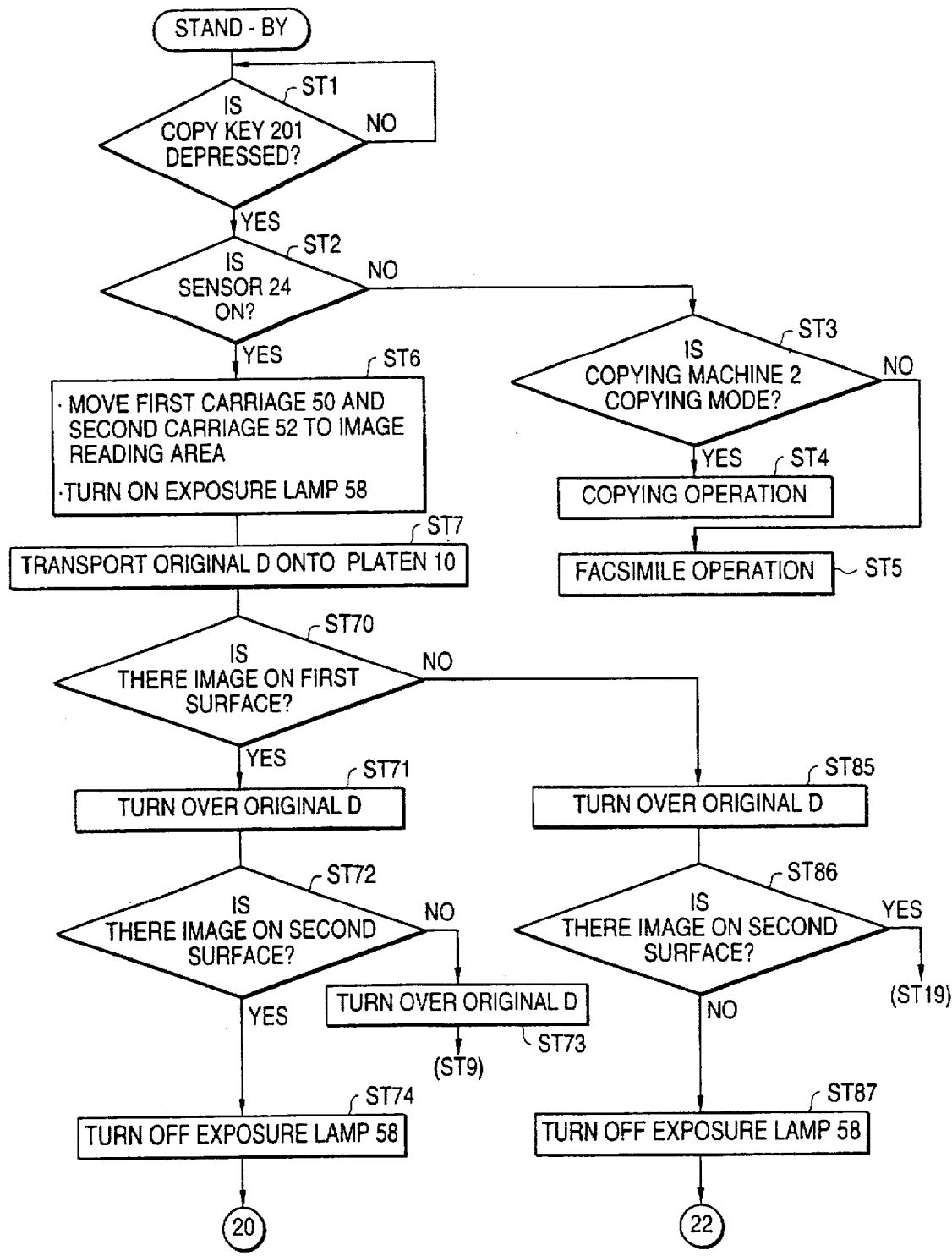
FIGS. 15(a), 15(b) and 15(c) represent a flow chart showing an operation of a control system of a sixth embodiment.
Figure 15B:
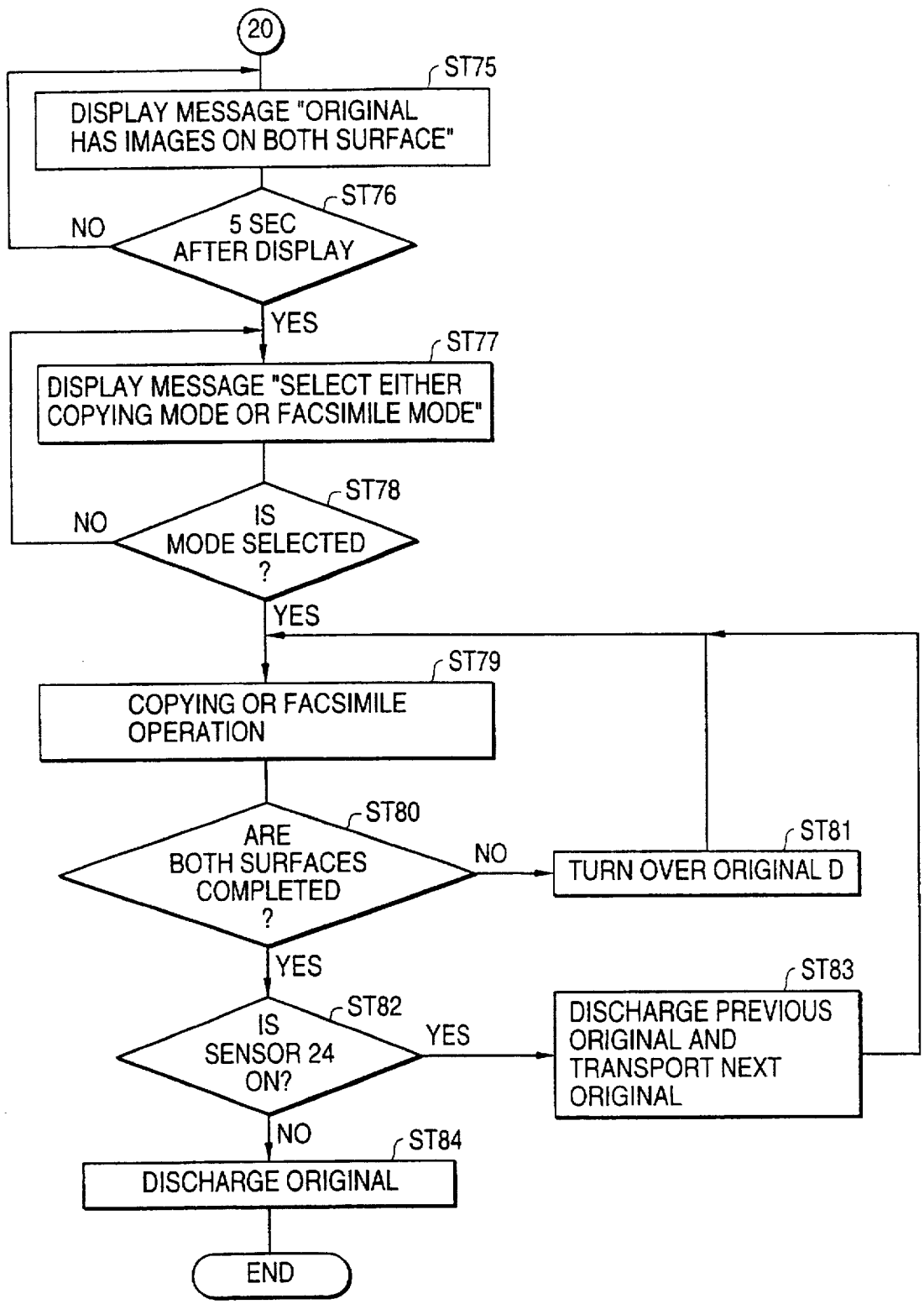
Figure 15C:
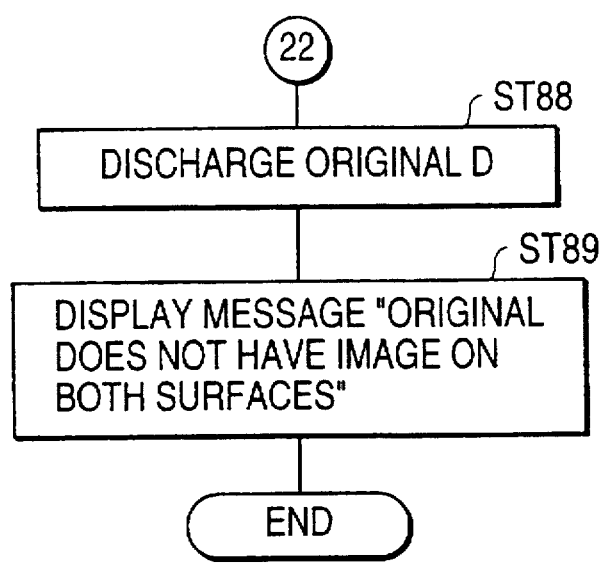

FIGS. 15(a), 15(b), and 15(c) show a sixth embodiment according to the invention. In this embodiment, main CPU 250 checks whether there is an image on both surfaces of original D. If main CPU 250 determines that there is an image only on one surface of original D, then main CPU 250 performs either the copying operation or the facsimile operation as in the first embodiment. If main CPU 250 determines that there is no image on both surfaces of original D, then main CPU 250 stops the operation. If main CPU 250 determines that there is image on both surfaces of original D, then main CPU 250 makes an operator select either the copying operation or the facsimile operation.

As shown in FIGS. 15(a), steps ST 1 to ST 7 are the same as those of the first embodiment.

After step ST 7, main CPU 250 checks whether there is an image on the first surface of original D (step ST 70). If main CPU 250 determines that there is image on the first surface, then main CPU 250 makes ADF CPU 274 act to turn over original D, and checks whether there is an image on the second surface (steps ST 71 and ST 72). If main CPU 250 determines that there is no image on the second surface, then main CPU 250 makes ADF CPU 274 act to turn over original D again (step ST 73). After that, the flow advances to step ST 9, and main CPU 250 performs subsequent steps from step ST 9 as discussed in the first embodiment.

If main CPU 250 determines at step ST 72 that there is an image on the second surface, namely, there is an image on both surfaces of original D, then main CPU 250 makes scanner CPU 280 act to turn off exposure lamp 58, and makes display section 228 display a message such as "ORIGINAL HAS IMAGES ON BOTH SURFACES" (steps ST 74 and ST 75). When 5 seconds have elapsed after the display, main CPU 250 makes display section 228 change to display a message such as "SELECT EITHER COPYING MODE OR FACSIMILE MODE" (steps ST 76 and ST 77).

When one of these modes is selected by an operator, main CPU 250 performs either the copying operation or the facsimile operation in accordance with the selected mode (steps ST 78 and ST 79). Main CPU 250 performs this operation on both surfaces per one original D (steps ST 80 and ST 81). After the operations on both surfaces have completed, main CPU 250 checks whether document-detecting sensor 24 is turned on (step ST 82). If main CPU 250 determines that document-detecting sensor 24 is turned on, then main CPU 250 makes ADF CPU 270 discharge the original placed on platen 10 to discharge portion 18A and transport the next original onto platen 10, and the flow returns to step ST 79 (step ST 83). If main CPU 250 determines at step ST 82 that document-detecting sensor 24 is turned off, then main CPU 250 makes ADF CPU 270 discharge the original placed on platen 10 to discharge portion 18A, and copying machine 2 enters the stand-by condition (step ST 84).

If main CPU 250 determines at step ST 70 that there is no image on the first surface, then main CPU 250 makes ADF CPU 274 turn over original D, and checks whether there is image on the second surface (steps ST 85 and ST 86). If main CPU 250 determines that there is image on the second surface, then the flow advances to step ST 19, and main CPU 250 performs subsequent steps from step ST 19 as discussed in the first embodiment.

If main CPU 250 determines at step ST 86 that there is no image on the second surface, namely, there is no image on both surfaces of original D, then main CPU 250 makes ADF CPU 274 discharge original D to discharge portion 18A (steps ST 87 and ST 88). After that, main CPU 250 makes display section 228 display a message such as "ORIGINAL DOES NOT HAVE IMAGE ON BOTH SURFACES", and copying machine enters the stand-by condition (step ST 89).

The present invention may be embodied in other specific forms without departing from the spirit or essential characteristics thereof. The presently described embodiments are therefore to be considered in all respects as illustrative and not restrictive. The scope of the present invention is indicated by the appended claims rather than by the foregoing description, and all changes which come within the meaning and range of equivalency of the claims are therefore intended to be embraced therein.

What is claimed is:

1. An image-data processing apparatus, comprising:
    an image-scanning portion, which converts an original image on an image-reading area to image data;
    an automatic-document feeder, the automatic-document feeder having a tray on which originals having the original image are placed, the automatic-document feeder being configured to transport the originals from the tray to the image-reading area one by one;
    an image-forming portion, which, in a first mode, forms an image on an image bearing member on the basis of the image data;
    a data transmission interface device configured to transmit the image data in a second mode; and
    a control system configured to automatically set the first mode when the originals are placed on the tray so that the automatic-document feeder transports the originals from a last sheet of the originals, and to automatically set the second mode when the originals are placed on the tray so that the automatic-document feeder transports the originals from a first sheet of the originals.

2. An image-data processing apparatus according to claim 1, wherein the control system includes detecting means for detecting a first condition in which the originals are placed on the tray so that the automatic-document feeder transports the originals from the last sheet of the originals, and detecting a second condition in which the originals are placed on the tray so that the automatic-document feeder transports the originals from the first sheet of the originals, and means for setting the first mode when the detecting means detects the first condition, and setting the second mode when the detecting means detects the second condition.

3. An image-data processing apparatus according to claim 2, further comprising means for displaying that the control system set the first mode, and displaying that the control system set the second mode.

4. An image-data processing apparatus according to claim 3, further comprising an input key for selecting one of the first mode and the second mode, wherein the control system includes a timer for counting a predetermined time period, the control system setting the mode selected by the input key when the input key is operated within a predetermined time period after the detecting means has detected one of the first condition and the second condition.

5. An image-data processing apparatus according to claim 2, wherein the automatic-document feeder includes a pick-up mechanism arranged adjacent to the tray, the pick-up mechanism picking up the originals placed on the tray beginning with the first sheet of the originals when the originals are placed on the tray so that a surface of an original having an image faces down, and the pick-up mechanism picking up the originals placed on the tray beginning with the last sheet of the originals when the originals are placed on the tray so that the surface of an original having the image faces up.

6. An image-data processing apparatus according to claim 5, wherein the automatic-document feeder includes a turn-over mechanism for selectively turning over an original before the image-scanning portion performs an image scanning operation so that an image on the original is read by the image-scanning portion, when the position of the surface having the image on the original transported by the automatic-document feeder from the tray to the image-reading area is such that the image fails to be read.

7. An image-data processing apparatus according to claim 5, wherein the detecting means includes means for receiving the image data from the image-scanning portion, first determining means for determining on the basis of the image data that the surface of an original in the image-reading area has an image, and second determining means for determining one of the first condition and the second condition on the basis of the determination of the first determining means.

8. An image-data processing apparatus according to claim 7, wherein the automatic-document feeder includes a turn-over mechanism for turning over the original so that an image on the original is read by the image-scanning portion when the first determining means determines that the surface does not have an image.

9. Am image-data processing apparatus according to claim 5, wherein the detecting means includes image detecting means for detecting that there is an image on a predetermined surface of the original while the automatic-document feeder transports the original.

10. An image-data processing apparatus according to claim 9, wherein the image-scanning portion includes means for scanning an original in the image-reading area to output the image data by moving at a first velocity, means for positioning the scanning means to face the image-reading area while the automatic-document feeder transports an original, and means for transmitting the image data to the image detecting means.

11. An image-data processing apparatus according to claim 10, wherein the automatic-document feeder includes means for driving a transport mechanism so that the transport mechanism transports an original at a second velocity more than the first velocity.

12. An image-data processing apparatus according to claim 10, wherein the image-scanning portion includes means for controlling the scanning means to output thinned image data when the image detecting means detects whether there is an image.

13. An image-data processing apparatus according to claim 10, wherein the image-scanning portion includes means for controlling the image detecting means to stop detecting when the image detecting means detects an image.

14. An image-data processing apparatus according to claim 5, wherein the detecting means includes second detecting means for detecting that there is an image on both surfaces of the original, further comprising means for displaying that the original has an image on both surfaces.

15. An image-data processing apparatus according to claim 14, further comprising an input key for selecting one of the first mode and the second mode when the second detecting means detects that there is an image on both surfaces of the original, and wherein the control system includes second setting means for setting one of the first mode and the second mode on the basis of the selection of the input key.

16. An image-processing method, comprising the steps of:
transporting originals from a tray in which originals having an original image are placed, to an image-reading area one by one;
converting the original image on the image-reading area to image data;
detecting one of a first condition in which the originals are placed on the tray so that the originals are transported from a last sheet of the originals and a second condition in which the originals are placed on the tray so that the originals are transported from a first sheet of the originals;
setting a first mode when the first condition is detected, and setting a second mode when the second condition is detected;
forming an image on an image bearing member on the basis of the image data when the first mode is set; and
transmitting the image data to a destination machine when the second mode is set.

17. An image-data processing apparatus, comprising:
means for reading an original image on an image-reading area to generate image data;
means for transporting originals having the original image, from a tray on which originals are placed, to the image-reading area one by one;
means for forming an image on an image bearing member on the basis of the image data in a first mode;
means for transmitting the image data to a destination machine in a second mode;
means for detecting a first condition in which the originals are placed on the tray so that the transporting means transports the originals from the last of the originals, and detecting a second condition in which the originals are placed on the tray so that the transporting means transports the originals from the first of the originals; and
means for automatically setting the first mode when the detecting means detects the first condition, and automatically setting the second mode when the detecting means detects the second condition.

18. An image-data processing apparatus, comprising:
an automatic-document feeder, the automatic-document feeder having a tray on which originals are placed, the tray being selectively utilized for both a copying function and a facsimile function, the automatic-document feeder transporting the originals from the tray one by one;
a copying device for performing the copying function;
a facsimile device for performing the facsimile function;
a control system configured to automatically cause the copying device to perform the copying function and to automatically cause the facsimile device to perform the facsimile function based on how the originals are placed on the tray.

19. An image-data processing apparatus according to claim 18, wherein the control system comprises a scanner for scanning an original transported from the automatic-document feeder to provide a scanned image, and wherein the control system determines how the originals are placed on the tray based on the scanned image.

20. An image-data processing apparatus according to claim 19, wherein the control system comprises a scanner for scanning an original transported from the automatic-document feeder to provide a scanned image, and wherein the control system determines whether the automatic-document feeder is transporting the originals from the first sheet or the last sheet of the originals based on the scanned image.

21. An image-data processing apparatus according to claim 18, wherein the control system automatically causes the copying device to perform the copying function when the originals are placed in the tray so that the automatic-document feeder transports the originals from a last sheet of the originals,
and wherein the control system automatically causes the facsimile device to perform the facsimile function when the originals are placed on the tray so that the automatic-document feeder transports the originals from a first sheet of the originals.

* * * * *